US012283226B2

(12) United States Patent
Chun et al.

(10) Patent No.: US 12,283,226 B2
(45) Date of Patent: Apr. 22, 2025

(54) DATA DRIVING CIRCUIT, DISPLAY DEVICE INCLUDING THE SAME, AND OPERATING METHOD OF DISPLAY DEVICE

(71) Applicant: Samsung Display Co., LTD., Yongin-si (KR)

(72) Inventors: Byung Ki Chun, Yongin-si (KR); Sun-Koo Kang, Yongin-si (KR); Myeongbin Lim, Yongin-si (KR); Min-Seok Bae, Yongin-si (KR); Kanghee Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/236,011

(22) Filed: Aug. 21, 2023

(65) Prior Publication Data

US 2024/0169894 A1 May 23, 2024

(30) Foreign Application Priority Data

Nov. 21, 2022 (KR) ........................ 10-2022-0156775

(51) Int. Cl.
*G09G 3/32* (2016.01)
*G09G 3/3291* (2016.01)

(52) U.S. Cl.
CPC ............ *G09G 3/32* (2013.01); *G09G 3/3291* (2013.01); *G09G 2310/0275* (2013.01); *G09G 2310/0291* (2013.01); *G09G 2320/0276* (2013.01); *G09G 2330/021* (2013.01); *G09G 2330/028* (2013.01)

(58) Field of Classification Search
CPC .................. G09G 3/32; G09G 3/3291; G09G 2310/0275; G09G 2310/0291; G09G 2320/0276; G09G 2330/021; G09G 2330/028
See application file for complete search history.

(56) References Cited

U.S. PATENT DOCUMENTS 9,148,134 B2 9/2015 Shibuya
11,393,401 B2 7/2022 Choi et al.
2004/0027320 A1* 2/2004 Ochi .................... G09G 3/3283 345/84
2014/0347401 A1* 11/2014 Hwang ................ G09G 3/3233 345/82
2016/0050402 A1* 2/2016 Jeong ..................... H04N 17/04 348/674
2019/0362665 A1* 11/2019 Chang ..................... H01L 23/60
2021/0241696 A1* 8/2021 Cho ..................... G09G 3/3291

FOREIGN PATENT DOCUMENTS

JP 2013120981 A 6/2013
KR 101238008 B1 3/2013
KR 20220050634 A 4/2022

* cited by examiner

*Primary Examiner* — Kenneth B Lee, Jr.
(74) *Attorney, Agent, or Firm* — CANTOR COLBURN LLP

(57) ABSTRACT

A data driving circuit includes: a reference voltage generator that receives a data control signal and generates a gamma reference voltage and a test reference voltage, a data driving unit that outputs a data signal for a pixel based on the gamma reference voltage, and an output circuit that outputs a test data voltage for a dummy pixel based on the test reference voltage.

20 Claims, 15 Drawing Sheets

DATA DRIVING CIRCUIT, DISPLAY DEVICE INCLUDING THE SAME, AND OPERATING METHOD OF DISPLAY DEVICE

This application claims priority under to Korean Patent Application No. 10-2022-0156775, filed on Nov. 21, 2022, and all the benefits accruing therefrom under 35 U.S.C. § 119, the content of which in its entirety is herein incorporated by reference.

BACKGROUND

Embodiments of the present disclosure described herein relate to a display device including a data driving circuit.

An electronic device, which provides images to users, such as a smartphone, a digital camera, a notebook computer, a navigation system, a monitor, and a smart television include a display device for displaying the images. The display device generates an image and provides the user with the generated image through a display screen.

The display device includes a plurality of pixels and a plurality of driving circuits for controlling the plurality of pixels. Each of the plurality of pixels includes a light emitting device and a pixel circuit for controlling the light emitting device. The pixel circuit may include a plurality of transistors organically connected with each other.

The display device may display an image by outputting a scan signal to a scan line connected with a pixel targeted for display and providing a data voltage corresponding to a display image to a data line connected with the pixel.

SUMMARY

Embodiments of the present disclosure provide a data driving circuit capable of outputting a test data voltage to detect the degree of degradation of a pixel.

Embodiments of the present disclosure provide a display device capable of detecting the degree of degradation of a pixel more accurately.

According to an embodiment, a data driving circuit includes: a reference voltage generator that receives a data control signal and generates a gamma reference voltage and a test reference voltage, a data driving unit that outputs a data signal for a pixel based on the gamma reference voltage, and an output circuit that outputs a test data voltage for a dummy pixel based on the test reference voltage.

In an embodiment, the data control signal may include information about a voltage level of the test reference voltage, and the reference voltage generator may generate the test reference voltage having a predetermined voltage level based on the data control signal.

In an embodiment, the reference voltage generator, the data driving unit, and the output circuit may be implemented with an integrated circuit, the integrated circuit may include a long edge and a short edge, the data signal may be output from the long edge of the integrated circuit, and the test data voltage may be output from the short edge of the integrated circuit.

In an embodiment, the reference voltage generator may include: a first input amplifier that receives an upper limit reference voltage, a second input amplifier that receives a lower limit reference voltage, a resistor string that is connected between an output terminal of the first input amplifier and an output terminal of the second input amplifier and outputs a plurality of voltages that have different voltage levels from each other, a first output amplifier that outputs one of the plurality of voltages from the resistor string as the gamma reference voltage, a decoder that selects one voltage among the plurality of voltages in response to the data control signal, and a second output amplifier that outputs the voltage selected by the decoder as the test reference voltage.

According to an embodiment, a display device includes: a display panel divided into an active area and a peripheral area and includes pixels disposed in the active area and dummy pixels disposed in the peripheral area, a data driver that receives an output image signal and a data control signal, provides a data signal to each of the pixels, and provides a test data voltage to the dummy pixels, a driving controller that provides the output image signal and the data control signal, and a degradation detection circuit that receives a sensing signal from the dummy pixels and provides a compensation signal corresponding to the sensing signal to the driving controller. The data driver is disposed in the peripheral area of the display panel, and the dummy pixels are disposed adjacent to a short edge of the data driver.

In an embodiment, the data driver may include a first data driving circuit and a second data driving circuit configured to drive some of the pixels, and the dummy pixels may be disposed between the first data driving circuit and the second data driving circuit.

In an embodiment, each of the dummy pixels may receive the test data voltage from one of the first data driving circuit and the second data driving circuit.

In an embodiment, the data driver may include a reference voltage generator that receives a data control signal and generates a gamma reference voltage and a test reference voltage, a data driving unit that outputs the data signal based on the gamma reference voltage, and an output circuit that receives the test reference voltage and to output the test data voltage.

In an embodiment, the data control signal may include information about a voltage level of the test reference voltage, and the reference voltage generator may generate the test reference voltage having a predetermined voltage level based on the data control signal.

In an embodiment, the reference voltage generator, the data driving unit, and the output circuit may be implemented with an integrated circuit, the integrated circuit may include a long edge and a short edge, the data signal may be output from the long edge of the integrated circuit, and the test data voltage may be output from the short edge of the integrated circuit.

In an embodiment, the first data driving circuit and the second data driving circuit may be sequentially disposed in a first direction, and the dummy pixels may include a first color dummy pixel and a second color dummy pixel sequentially disposed in the first direction between the first data driving circuit and the second data driving circuit.

In an embodiment, the test data voltage output from the first data driving circuit may be provided to the first color dummy pixel, and the test data voltage output from the second data driving circuit may be provided to the second color dummy pixel.

In an embodiment, the test reference voltage output from the first data driving circuit may correspond to a first color, the test reference voltage output from the second data driving circuit may correspond to a second color, the first data driving circuit may output a first color test data voltage based on the test reference voltage from the first data driving circuit and may output a second color test data voltage based on the test reference voltage from the second data driving circuit, and the first color test data voltage from the first data driving circuit may be provided to the first color dummy pixel.

In an embodiment, the test reference voltage output from the first data driving circuit may correspond to a first color, the test reference voltage output from the second data driving circuit may correspond to a second color, the second data driving circuit may output a first color test data voltage based on the test reference voltage from the first data driving circuit and may output a second color test data voltage based on the test reference voltage from the second data driving circuit, and the second color test data voltage from the second data driving circuit may be provided to the second color dummy pixel.

In an embodiment, the output image signal may include active data to be provided to the pixel, the data control signal may include a frame protocol including the information about the voltage level of the test reference voltage, one frame may include an active period and a blank period, the active data may be provided from the driving controller to the data driver during the active period, and the frame protocol may be provided from the driving controller to the data driver during the blank period.

In an embodiment, the reference voltage generator may include a first input amplifier that receives an upper limit reference voltage, a second input amplifier that receives a lower limit reference voltage, a resistor string that is connected between an output terminal of the first input amplifier and an output terminal of the second input amplifier and outputs a plurality of voltages, a first output amplifier that outputs one of the plurality of voltages from the resistor string as the gamma reference voltage, a decoder that selects one voltage among the plurality of voltages in response to the data control signal, and a second output amplifier that outputs the voltage selected by the decoder as the test reference voltage.

According to an embodiment, an operating method of a display device includes transmitting a data control signal from a driving controller to a data driving circuit, generating a test reference voltage in response to the data control signal, providing a test data voltage corresponding to the test reference voltage to a dummy pixel, receiving a sensing signal from the dummy pixel, and outputting a compensation signal corresponding to the sensing signal.

In an embodiment, the data control signal may include information about a voltage level of the test reference voltage, and the generating of the test reference voltage may include generating the test reference voltage having a predetermined voltage level based on the data control signal.

In an embodiment, the dummy pixel may be disposed adjacent to a short edge of the data driving circuit, and the test data voltage may be output from the short edge of the data driving circuit.

In an embodiment, the method may further include predicting a characteristic change of a pixel based on the compensation signal, and outputting an output image signal corresponding to the predicted characteristic change, by the driving controller.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
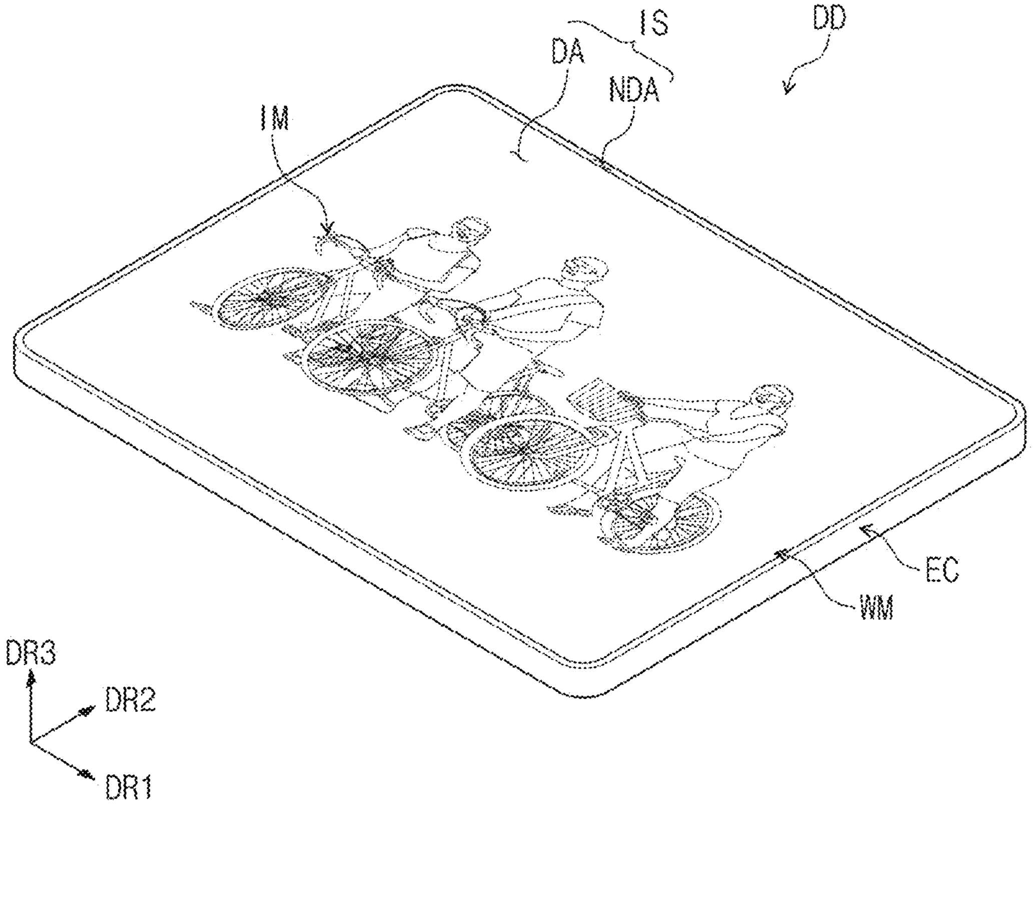
FIG. 1 is a perspective view illustrating a display device according to an embodiment of the present disclosure.

In the specification, the expression that a first component (or region, layer, part, etc.) is “on”, “connected with”, or “coupled with” a second component means that the first component is directly on, connected with, or coupled with the second component or means that a third component is interposed therebetween.

The same reference numerals/signs refer to the same components. Also, in drawings, thicknesses, proportions, and dimensions of components may be exaggerated to describe the technical features effectively. The term “and/or” includes one or more combinations of the associated listed items.

The terms “first”, “second”, etc. are used to describe various components, but the components are not limited by the terms. The terms are only used to distinguish one component from another component. For example, without departing from the scope and spirit of the invention, a first component may be referred to as a “second component”, and similarly, the second component may be referred to as the “first component”. The articles “a”, “an”, and “the” are singular in that they have a single referent, but the use of the singular form in the specification should not preclude the presence of more than one referent.

Also, the terms “under”, “beneath”, “on”, “above”, etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings.

Figure 2:
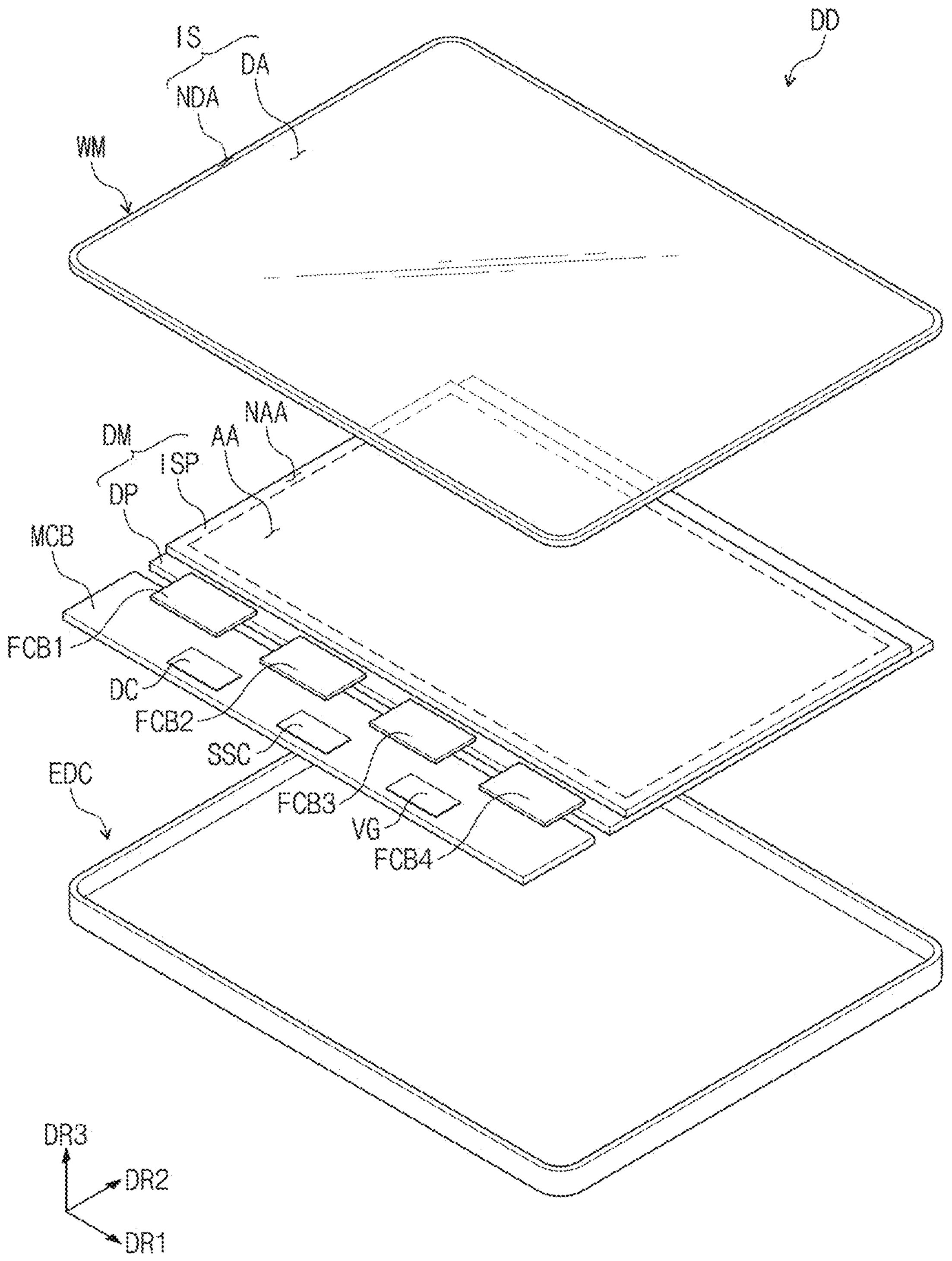
FIG. 2 is an exploded perspective view of a display device according to an embodiment of the present disclosure.

FIG. 1 is a perspective view of a display device according to an embodiment of the present disclosure, and FIG. 2 is an exploded perspective view of a display device according to an embodiment of the present disclosure.

Referring to FIGS. 1 and 2, a display device DD may refer to a device that displays an image depending on an electrical signal. In an embodiment, the display device DD may be implemented with an independent device. In an embodiment, the display device DD may be a small and medium-sized electronic device, such as a mobile phone, a tablet, an automotive navigation system, or a game console, as well as a large-sized electronic device, such as a television or a monitor.

The display device DD is in the shape of a rectangle having a long edge (or side) in a first direction DR1 and having a short edge (or side) in a second direction DR2 intersecting the first direction DR1. However, the shape of the display device DD is not limited thereto. For another example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined with respect to a direction in which the image IM is displayed. The front surface and the rear surface may be opposite to each other in the third direction DR3, and the normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions that the first, second, and third directions DR1, DR2, and DR3 indicate may be relative in concept and may be changed to different directions.

In an embodiment, the display device DD may sense an external input that is applied from the outside. The external input may include various types of inputs that are provided from the outside of the display device DD. The display device DD according to an embodiment of the present disclosure may sense an external input of a user, which is applied from the outside. The external input of the user may be one of various types of external inputs, such as a part of his/her body, a light, heat, his/her eye, and pressure, or a combination thereof. Also, the display device DD may sense the external input of the user applied to the side surface or rear surface of the display device DD depending on a structure of the display device DD and is not limited to an embodiment. As an example of the present disclosure, the external input may include an input that is applied by using an input device (e.g., a stylus pen, an active pen, a touch pen, an electronic pen, or an E-pen).

The display surface IS of the display device DD may be divided into a display area DA and a non-display area NDA. The display area DA may refer to an area in which the image IM is displayed. The user visually perceives the image IM through the display area DA. In an embodiment, the display area DA is illustrated in the shape of a quadrangle whose vertexes are rounded. However, this is illustrated as an example. The display area DA may have various shapes, not limited to any one embodiment.

The non-display area NDA is adjacent to the display area DA. The non-display area NDA may have a given color. The non-display area NDA may surround the display area DA. As such, the shape of the display area DA may be defined substantially by the non-display area NDA. However, this is illustrated as an example. The non-display area NDA may be disposed adjacent to only one side of the display area DA or may be omitted. The display device DD according to an embodiment of the present disclosure may include various embodiments and is not limited to any one embodiment.

As illustrated in FIG. 2, the display device DD may include a display module DM and a window WM disposed on or over the display module DM. The display module DM may include a display panel DP and an input sensing layer ISP.

The display panel DP according to an embodiment of the present disclosure may be a light emitting display panel. In an embodiment, for example, the display panel DP may be an organic light emitting display panel, an inorganic light emitting display panel, a quantum dot light emitting display panel. An emission layer of the organic light emitting display panel may include an organic light emitting material. An emission layer of the inorganic light emitting display panel may include an inorganic light emitting material. An emission layer of the quantum dot light emitting display panel may include a quantum dot, a quantum rod, etc. In an embodiment, below, the description will be given under the condition that the display panel DP is an organic light emitting display panel.

The display panel DP may output the image IM, and the output image IM may be displayed through the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP by a consecutive process. That is, in the case where the input sensing layer ISP is directly disposed on the display panel DP, an inner adhesive film (not illustrated) is not interposed between the input sensing layer ISP and the display panel DP. In another embodiment, the inner adhesive film may be interposed between the input sensing layer ISP and the display panel DP. In this case, the input sensing layer ISP is not manufactured by a process continuous to a manufacturing process of the display panel DP. That is, the input sensing layer ISP may be manufactured through a process that is independent of the manufacturing process of the display panel DP and may then be fixed on an upper surface of the display panel DP by the inner adhesive film.

The window WM may be formed of or include a transparent material capable of outputting the image IM. In an embodiment, for example, the window WM may be formed of glass, sapphire, plastic, etc. An example in which the window WM is implemented with a single layer is illustrated, but the present disclosure is not limited thereto. For another example, the window WM may include a plurality of layers.

In an embodiment, the window WM may include a light blocking pattern for defining the non-display area NDA. The light blocking pattern that is a colored organic film may be formed, for example, in a coating manner.

The window WM may be coupled to the display module DM by an adhesive film. As an example of the present disclosure, the adhesive film may include an optically clear adhesive ("OCA") film. However, the adhesive film is not limited thereto. For another example, the adhesive film may include a typical adhesive or sticking agent. For example, the adhesive film may include an optically clear resin ("OCR") film or a pressure sensitive adhesive ("PSA") film.

An anti-reflection layer may be further disposed between the window WM and the display module DM. The anti-reflection layer decreases reflectance of an external light incident from above the window WM. The anti-reflection layer according to an embodiment of the present disclosure may include a retarder and a polarizer. The polarizer may be of a film type or a liquid crystal coating type. The polarizer may also be of a film type or a liquid crystal coating type. The film type may include a stretch-type synthetic resin film, and the liquid crystal coating type may include liquid crystals arranged in a given direction. The retarder and the polarizer may be implemented with one polarization film.

As an example of the present disclosure, the anti-reflection layer may also include color filters. An array of color filters may be determined in consideration of colors of lights that a plurality of pixels PX (refer to FIG. 6) included in the display panel DP generate. Also, the anti-reflection layer may further include a light blocking pattern.

The display module DM may display the image IM depending on an electrical signal and may send/receive information about an external input. The display module DM may be defined as an active area AA and a peripheral area NAA. The active area AA may be defined as an area where the image IM provided from the display module DM is output. Also, the active area AA may be defined as an area where the input sensing layer ISP senses an external input applied from the outside.

The peripheral area NAA is adjacent to the active area AA. In an embodiment, for example, the peripheral area NAA may surround the active area AA. However, this is illustrated as an example. For another example, the peripheral area NAA may be defined in various shapes, not limited to any one embodiment. According to an embodiment, the active area AA of the display module DM may correspond to at least a portion of the display area DA.

The display module DM may further include a main circuit board MCB and flexible circuit films FCB1 to FCB4. The main circuit board MCB may be connected with the flexible circuit films FCB1 to FCB4 so as to be electrically connected with the display panel DP. The flexible circuit films FCB1 to FCB4 are connected with the display panel DP to electrically connect the display panel DP and the main circuit board MCB. Four flexible circuit films FCB1 to FCB4 are illustrated in FIG. 2, but the present disclosure is not limited thereto. The number of flexible circuit films FCB1 to FCB4 may be variously changed.

The display module DM may include a driving controller DC, a degradation detection circuit SSC, and a voltage generator VG that are disposed on the main circuit board MCB. The driving controller DC may include circuits for driving the display panel DP.

Figure 6:
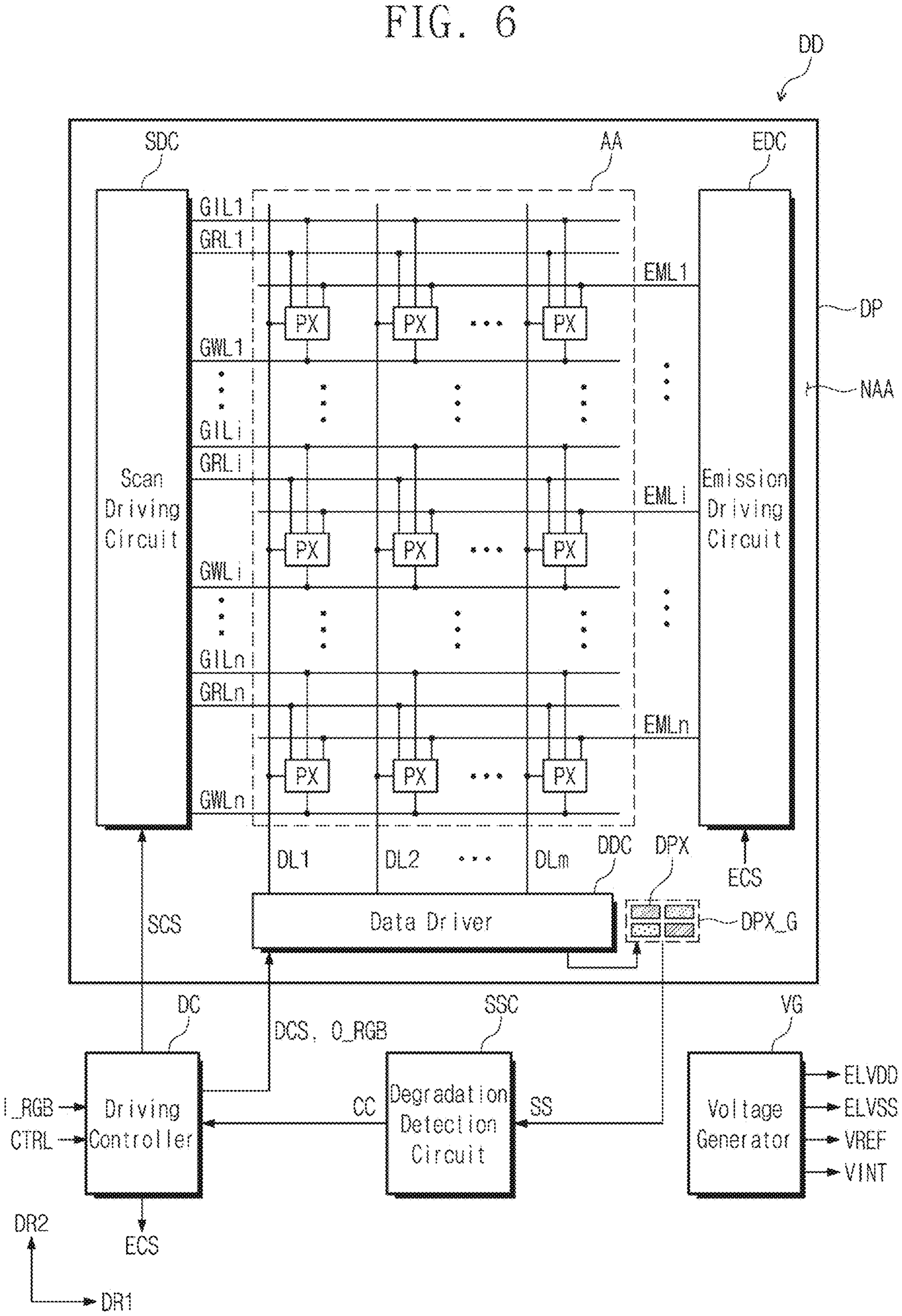
FIG. 6 is a block diagram of a display device according to an embodiment of the present disclosure.

The degradation detection circuit SSC may receive a sensing signal from dummy pixels disposed in the display panel DP, may determine the degree of degradation of pixels based on the sensing signal, and may output a compensation signal CC (refer to FIG. 6). In an embodiment, the compensation signal CC may be provided to the driving controller DC.

The voltage generator VG may generate voltages for an operation of the display panel DP.

The driving controller DC, the degradation detection circuit SSC, and the voltage generator VG may be implemented with independent integrated circuits, respectively, and may be mounted on the main circuit board MCB. In an embodiment, the driving controller DC and the degradation detection circuit SSC may be implemented with a single circuit. In an embodiment, the driving controller DC and the degradation detection circuit SSC may be implemented with a single circuit.

The input sensing layer ISP may be electrically connected with the main circuit board MCB through the flexible circuit films FCB1 to FCB4. However, the present disclosure is not limited thereto. That is, the display module DM may additionally include a separate flexible circuit film for electrically connecting the input sensing layer ISP and the main circuit board MCB in another embodiment.

The display device DD further includes an outer case EC accommodating the display module DM. The outer case EC may be coupled to the window WM to define the exterior of the display device DD. The outer case EC may absorb shocks from the outside and may prevent a foreign material/moisture or the like from being infiltrated into the display module DM such that components accommodated in the outer case EC are protected. As an example of the present disclosure, the outer case EC may be implemented by coupling a plurality of accommodating members.

Figure 3:
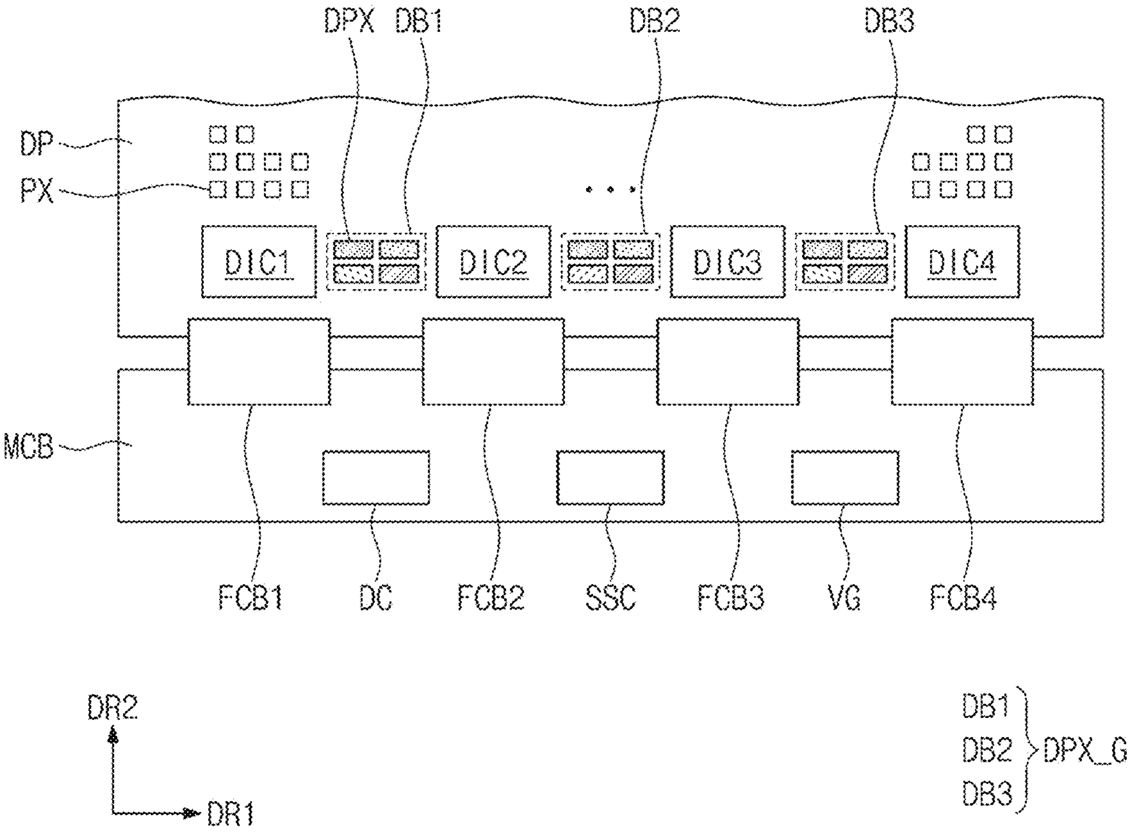
FIG. 3 is a plan view illustrating a portion of a display panel.

FIG. 3 is a plan view illustrating a portion of the display panel DP.

Referring to FIG. 3, the display panel DP may be electrically connected with the main circuit board MCB through the flexible circuit films FCB1 to FCB4.

Data driving circuits DIC1 to DIC4, pixels PX, and dummy pixels DPX may be disposed in the display panel DP.

The display panel DP may be defined as the active area AA and the peripheral area NAA. The pixels PX may be disposed in the active area AA, and the data driving circuits DIC1 to DIC4 and the dummy pixels DPX may be disposed in the peripheral area NAA (See FIG. 6).

The pixels PX may be disposed to be spaced from each other in the first direction DR1 and the second direction DR2 as much as a given distance.

The data driving circuits DIC1 to DIC4 may be sequentially disposed in the first direction DR1. In an embodiment, the number of data driving circuits DIC1 to DIC4 may be equal to the number of flexible circuit films FCB1 to FCB4, but the present disclosure is not limited thereto. In another embodiment, each of the data driving circuits DIC1 to DIC4 may be implemented with an integrated circuit and may be mounted on the display panel DP.

In an embodiment, each of the dummy pixels DPX may include substantially the same circuit configuration as the pixels PX. The dummy pixels DPX may be disposed between the data driving circuits DIC1 to DIC4.

A dummy pixel group DPX_G may include dummy pixel blocks DB1, DB2, and DB3. Each of the dummy pixel blocks DB1, DB2, and DB3 may include a plurality of dummy pixels DPX. In an embodiment, each of the dummy pixel blocks DB1, DB2, and DB3 may include four dummy pixels DPX. The dummy pixel block DB1 may be disposed between the data driving circuits DIC1 and DIC2, the dummy pixel block DB2 may be disposed between the data driving circuits DIC2 and DIC3, and the dummy pixel block DB3 may be disposed between the data driving circuits DIC3 and DIC4. The number of dummy pixels DPX included in each of the dummy pixel blocks DB1, DB2, and DB3 may be variously changed.

In response to signals provided from the driving controller DC, each of the data driving circuits DIC1 to DIC4 may provide a data signal to each pixel PX and may provide a test data voltage to each dummy pixel DPX.

The characteristics of the pixels PX may change as an operating time of the pixels PX passes. When the dummy pixels DPX operate under a condition similar to conditions of the pixels PX, the dummy pixels DPX may be degraded to be similar to the pixels PX. In an embodiment, the data driving circuits DIC1 to DIC4 may provide the test data voltages to the dummy pixels DPX such that the dummy pixels DPX is capable of operating under the condition similar to the condition of the pixels PX. In another embodiment, the data driving circuits DIC1 to DIC4 may adjust the test data voltages to the dummy pixels DPX such that a degradation speed of the dummy pixels DPX is higher than a degradation speed of the pixels PX. That is, the degradation speed of the dummy pixels DPX may be adjusted by changing the voltage level of the test data voltage.

In an embodiment, the driving controller DC may determine the voltage level of the test data voltage depending on a characteristic of the display panel DP, a characteristic of an image (e.g., a characteristic of an input image signal I_RGB (refer to FIG. 6)) to be displayed in the display panel DP, a test purpose, etc. The driving controller DC may provide the data driving circuits DIC1 to DIC4 with information about the determined voltage level of the test data voltage. Each of the data driving circuits DIC1 to DIC4 may provide the dummy pixels DPX with the test data voltage of a given voltage level based on the information received from the driving controller DC.

Figure 4A:
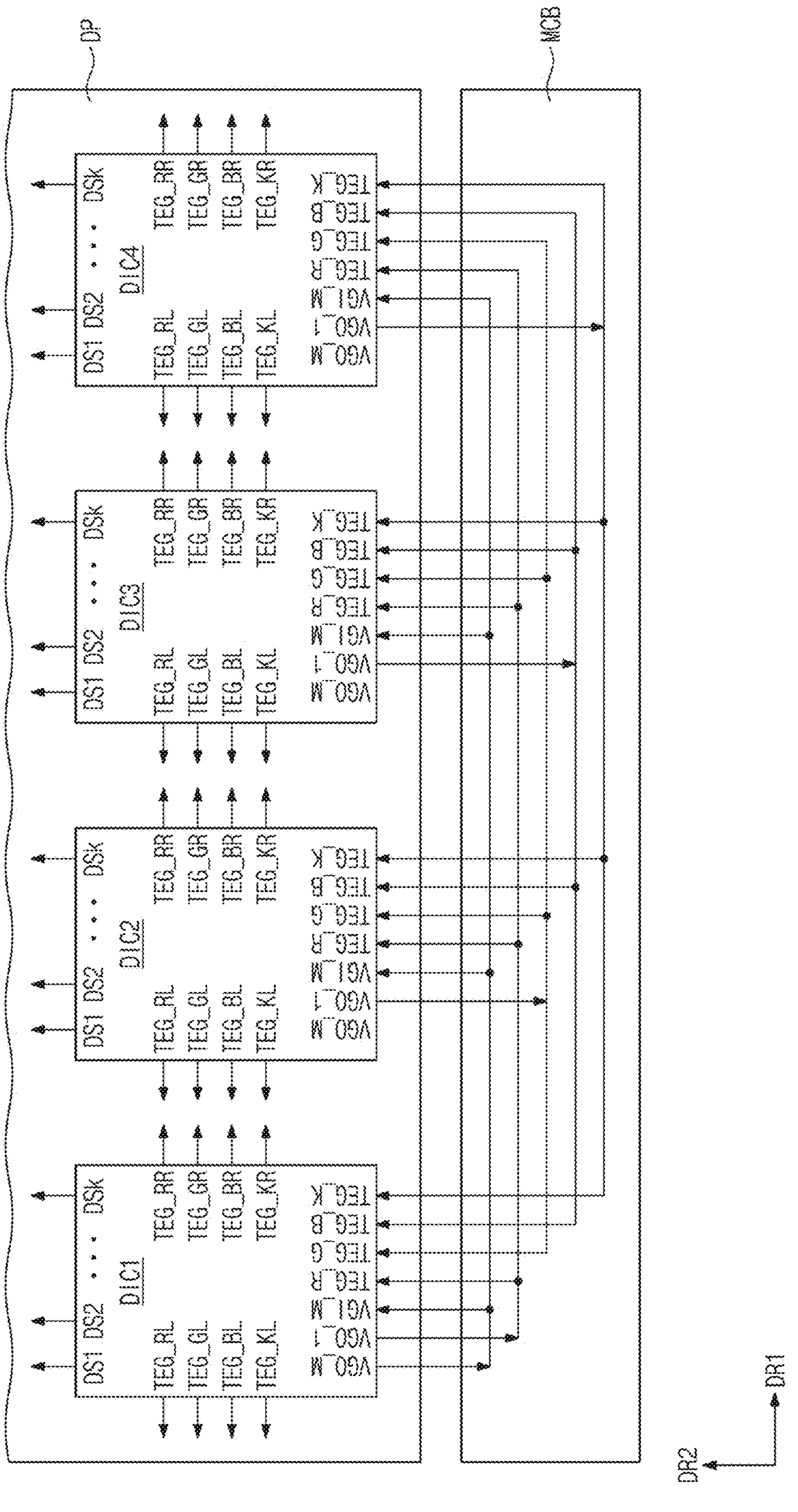
FIG. 4A is a diagram illustrating data driving circuits disposed in a display panel according to an embodiment of the present disclosure.

FIG. 4A is a diagram illustrating the data driving circuits DIC1 to DIC4 disposed in the display panel DP according to an embodiment of the present disclosure.

FIG. 4A shows voltages input to the data driving circuits DIC1 to DIC4 and voltages output from the data driving circuits DIC1 to DIC4 as an example.

Each of the data driving circuits DIC1 to DIC4 illustrated in FIG. 4A may include substantially the same circuit configuration and may receive or output the same voltages. Voltages being identical to each other from among voltages input/output to/from the data driving circuits DIC1 to DIC4 are marked by the same reference sign.

In an embodiment, one of the data driving circuits DIC1 to DIC4 may operate as a master, and the rest thereof may operate as a slave. In the example illustrated in FIG. 4A, the data driving circuit DIC1 operates as a master, and the data driving circuits DIC2, DIC3, and DIC4 operate as a slave. However, the present disclosure is not limited to the example illustrated in FIG. 4A. The data driving circuits DIC1 to DIC4 may operate independently of each other without a master-slave relationship in another embodiment.

Referring to FIG. 4A, the data driving circuit DIC1 that is a master outputs a gamma reference voltage VGO_M and a test reference voltage VGO_1. Each of the data driving circuits DIC2 to DIC4 that operate as a slave outputs the test reference voltage VGO_1.

The gamma reference voltage VGO_M output from the data driving circuit DIC1 may be provided to the data driving circuits DIC1 to DIC4. Each of the data driving circuits DIC1 to DIC4 receives the gamma reference voltage VGO_M as a master input voltage VGI_M.

Each of the data driving circuits DIC1 to DIC4 may output data signals DS1 to DSk to be provided to the pixels PX (refer to FIG. 3) based on the master input voltage VGI_M.

The test reference voltage VGO_1 output from the data driving circuit DIC1 may be provided to the data driving circuits DIC1 to DIC4. Each of the data driving circuits DIC1 to DIC4 receives the test reference voltage VGO_1 from the data driving circuit DIC1 as a first input voltage TEG_R.

The test reference voltage VGO_1 output from the data driving circuit DIC2 may be provided to the data driving circuits DIC1 to DIC4. Each of the data driving circuits DIC1 to DIC4 receives the test reference voltage VGO_1 from the data driving circuit DIC2 as a second input voltage TEG_G.

The test reference voltage VGO_1 output from the data driving circuit DIC3 may be provided to the data driving circuits DIC1 to DIC4. Each of the data driving circuits DIC1 to DIC4 receives the test reference voltage VGO_1 from the data driving circuit DIC3 as a third input voltage TEG_B.

The test reference voltage VGO_1 output from the data driving circuit DIC4 may be provided to the data driving circuits DIC1 to DIC4. Each of the data driving circuits DIC1 to DIC4 receives the test reference voltage VGO_1 from the data driving circuit DIC4 as a fourth input voltage TEG_K.

Each of the data driving circuits DIC1 to DIC4 may output test data voltages TEG_RL, TEG_GL, TEG_BL, TEG_KL, TEG_RR, TEG_GR, TEG_BR, and TEG_KR to drive the dummy pixels DPX (refer to FIG. 3) based on the first to fourth input voltages TEG_R, TEG_G, TEG_B, and TEG_K.

In an embodiment, each of the data driving circuits DIC1 to DIC4 may generate the test data voltages TEG_RL and TEG_RR based on the first input voltage TEG_R. Each of the data driving circuits DIC1 to DIC4 may generate the test data voltages TEG_GL and TEG_GR based on the second input voltage TEG_G. Each of the data driving circuits DIC1 to DIC4 may generate the test data voltages TEG_BL and TEG_BR based on the third input voltage TEG_B. Each of the data driving circuits DIC1 to DIC4 may generate the test data voltages TEG_KL and TEG_KR based on the fourth input voltage TEG_K.

An example in which each of the data driving circuits DIC1 to DIC4 outputs the test data voltages TEG_RL, TEG_GL, TEG_BL, TEG_KL, TEG_RR, TEG_GR, TEG_BR, and TEG_KR based on the first to fourth input voltages TEG_R, TEG_G, TEG_B, and TEG_K is illustrated in FIG. 4A, but the present disclosure is not limited thereto.

In an embodiment, each of the data driving circuits DIC1 to DIC4 may receive only some of the first to fourth input voltages TEG_R, TEG_G, TEG_B, and TEG_K to generate some or all of the test data voltages TEG_RL, TEG_GL, TEG_BL, TEG_KL, TEG_RR, TEG_GR, TEG_BR, and TEG_KR. In another embodiment, each of the data driving circuits DIC1 to DIC4 may generate some or all of the test data voltages TEG_RL, TEG_GL, TEG_BL, TEG_KL, TEG_RR, TEG_GR, TEG_BR, and TEG_KR without receiving a voltage from the outside.

The gamma reference voltage VGO_M output from the data driving circuit DIC1 and the test reference voltages VGO_1 respectively output from the data driving circuits DIC1 to DIC4 may be provided to the data driving circuits DIC1 to DIC4 through the flexible circuit films FCB1 to FCB4 illustrated in FIG. 3 and the main circuit board MCB illustrated in FIG. 4A.

Figure 4B:
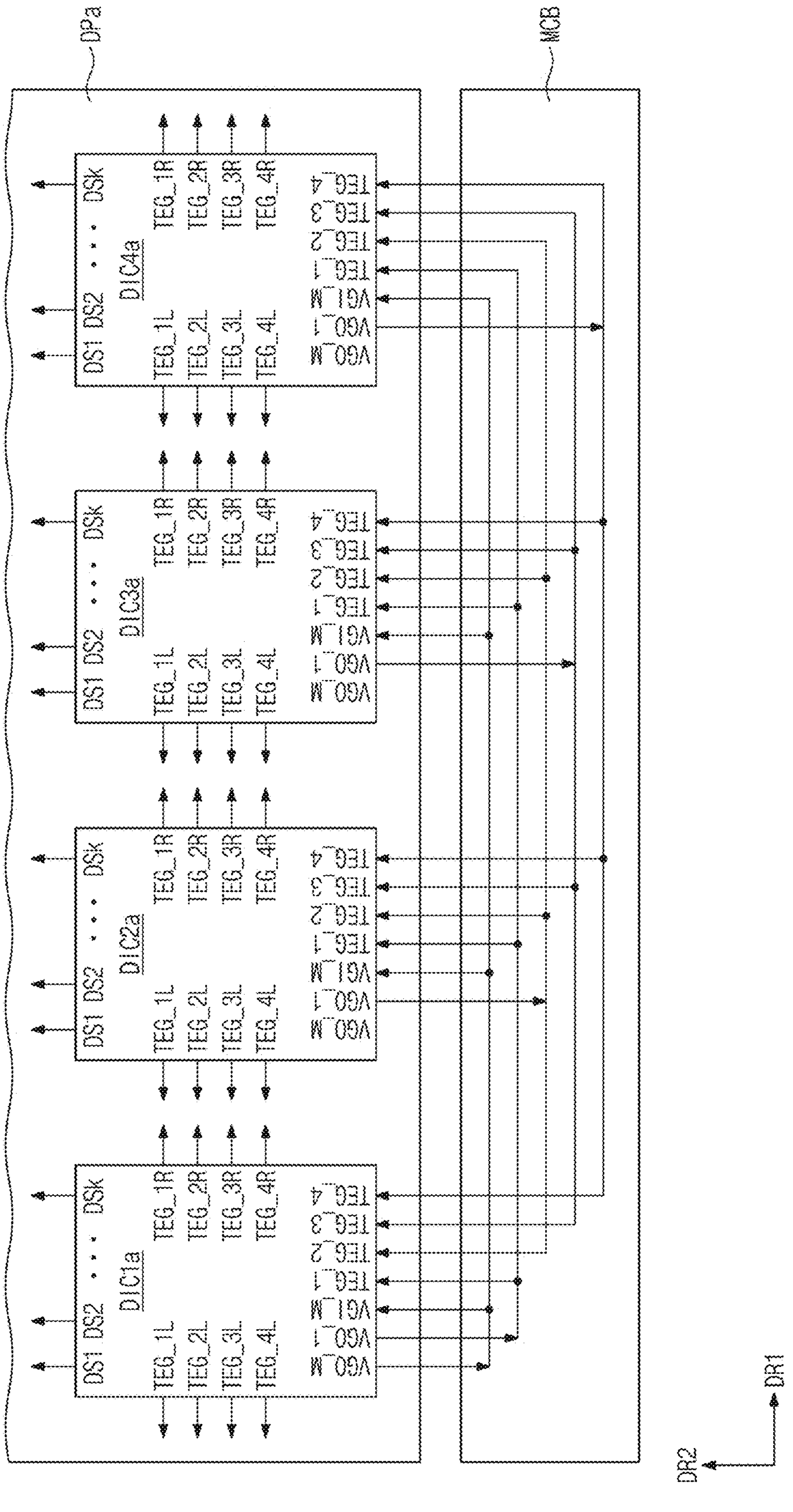
FIG. 4B is a diagram illustrating data driving circuits disposed in a display panel according to another embodiment of the present disclosure.

FIG. 4B is a diagram illustrating data driving circuits DIC1*a* to DIC4*a* disposed in a display panel DPa according to another embodiment of the present disclosure.

FIG. 4B shows voltages input to the data driving circuits DIC1*a* to DIC4*a* and voltages output from the data driving circuits DIC1*a* to DIC4*a* as an example.

The data driving circuits DIC1*a* to DIC4*a* illustrated in FIG. 4B are similar to the data driving circuits DIC1 to DIC4 illustrated in FIG. 4A, respectively, and thus, additional description will be omitted to avoid redundancy.

In an embodiment, one of the data driving circuits DIC1*a* to DIC4*a* may operate as a master, and the rest thereof may operate as a slave. In another embodiment, the data driving circuits DIC1*a* to DIC4*a* may operate independently of each other without a master-slave relationship.

Each of the data driving circuits DIC1*a* to DIC4*a* may output test data voltages TEG_1L, TEG_2L, TEG_3L, TEG_4L, TEG_1R, TEG_2R, TEG_3R, and TEG_4R to drive the dummy pixels DPX (refer to FIG. 3) based on first to fourth input voltages TEG_1, TEG_2, TEG_3, and TEG_4.

In an embodiment, each of the data driving circuits DIC1*a* to DIC4*a* may generate the test data voltages TEG_1L and TEG_1R based on the first input voltage TEG_1. Each of the data driving circuits DIC1*a* to DIC4*a* may generate the test data voltages TEG_2L and TEG_2R based on the second input voltage TEG_2. Each of the data driving circuits DIC1*a* to DIC4*a* may generate the test data voltages TEG_3L and TEG_3R based on the third input voltage TEG_3. Each of the data driving circuits DIC1*a* to DIC4*a* may generate the test data voltages TEG_4L and TEG_4R based on the fourth input voltage TEG_4.

The number of voltages that each of the data driving circuits DIC1*a* to DIC4*a* receives and the number of test data voltages that each of the data driving circuits DIC1*a* to DIC4*a* outputs may be variously changed.

Also, the first to fourth input voltages TEG_1, TEG_2, TEG_3, and TEG_4 that each of the data driving circuits DIC1*a* to DIC4*a* receives are not limited to specific colors. Likewise, the test data voltages TEG_1L, TEG_2L, TEG_3L, TEG_4L, TEG_1R, TEG_2R, TEG_3R, and TEG_4R that each of the data driving circuits DIC1*a* to DIC4*a* outputs are not limited to specific colors.

Figure 5A:
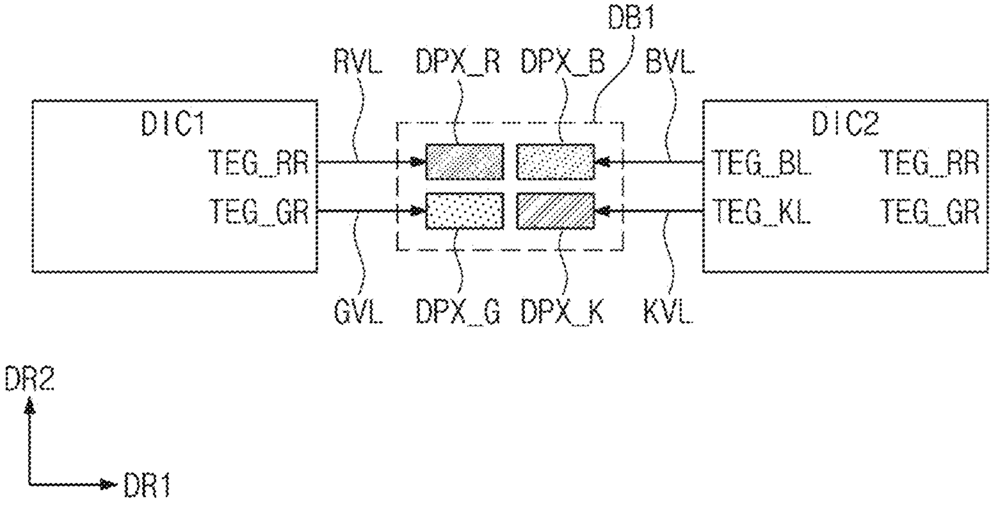
FIG. 5A is a diagram illustrating an example in which data driving circuits provide test data voltages to dummy pixels.

FIG. 5A is a diagram illustrating an example in which the data driving circuits DIC1 and DIC2 provide test data voltages to dummy pixels.

Referring to FIG. 5A, the dummy pixel block DB1 may be disposed between the data driving circuits DIC1 and DIC2. The dummy pixel block DB1 includes four dummy pixels DPX_R, DPX_G, DPX_B, and DPX_K.

In an embodiment, the four dummy pixels DPX_R, DPX_G, DPX_B, and DPX_K may correspond to pixels PX outputting lights of different colors, respectively, from among the pixels PX illustrated in FIG. 3 or may be substantially identical thereto. In an embodiment, for example, the dummy pixels DPX_R, DPX_G, DPX_B, and DPX_K may correspond to the pixels PX outputting a red light, a green light, a blue light, and a black light, respectively. The colors of the four dummy pixels DPX_R, DPX_G, DPX_B, and DPX_K are not limited thereto and may be variously changed. For another example, the four dummy pixels DPX_R, DPX_G, DPX_B, and DPX_K may correspond to a white, a yellow, a magenta, and a cyan, respectively.

In an embodiment, the four dummy pixels DPX_R, DPX_G, DPX_B, and DPX_K may be arranged in a matrix with two rows and two columns.

The dummy pixels DPX_R and DPX_G may receive the test data voltages TEG_RR and TEG_GR, respectively, from the data driving circuit DIC1 disposed adjacent thereto. The dummy pixels DPX_B and DPX_K may receive the test data voltages TEG_BR and TEG_KR, respectively, from the data driving circuit DIC2 disposed adjacent thereto.

Each of the data driving circuits DIC1 and DIC2 includes a long edge (or a long side) in the first direction DR1 and includes a short edge (or a short side) in the second direction DR2. The data driving circuit DIC1 may provide the test data voltages TEG_RR and TEG_GR to the dummy pixels DPX_R and DPX_G through voltage lines RVL and GVL, respectively, extending from the short edge in the first direction DR1.

The data driving circuit DIC2 may provide the test data voltages TEG_BL and TEG_KL to the dummy pixels DPX_B and DPX_K through voltage lines BVL and KVL, respectively, extending from the short edge in a direction opposite to the first direction DR1.

As illustrated in FIGS. 4A and 5A, the test data voltages TEG_RL, TEG_GL, TEG_BL, TEG_KL, TEG_RR, TEG_GR, TEG_BR, and TEG_KR are output from the short edges of each of the data driving circuits DIC1 to DIC4. In an embodiment, the data signals DS1 to DSk that are provided to the pixels PX may be output from the long edge of each of the data driving circuits DIC1 to DIC4.

The data driving circuits DIC1 to DIC4 may output the data signals DS1 to DSk as much as the number of pixels PX disposed in one row of the active area AA of the display panel DP. A length of the long edge of each of the data driving circuits DIC1 to DIC4 is restrictive.

In an embodiment, each of the data driving circuits DIC1 to DIC4 may output the test data voltages TEG_RL, TEG_GL, TEG_BL, TEG_KL, TEG_RR, TEG_GR, TEG_BR, and TEG_KR from the short edges thereof. Accordingly, it may be easy to design channels for outputting the test data voltages TEG_RL, TEG_GL, TEG_BL, TEG_KL, TEG_RR, TEG_GR, TEG_BR, and TEG_KR in the data driving circuits DIC1 to DIC4.

Figure 5B:
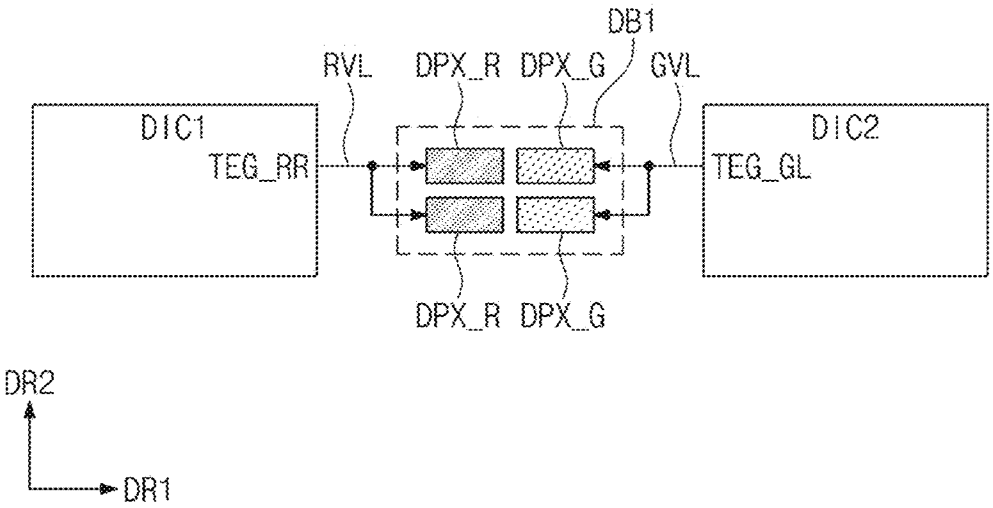
FIG. 5B is a diagram illustrating another example in which data driving circuits provide test data voltages to dummy pixels.

FIG. 5B is a diagram illustrating another example in which the data driving circuits DIC1 and DIC2 provide test data voltages to dummy pixels.

Referring to FIG. 5B, each of the data driving circuits DIC1 and DIC2 may output a test data voltage corresponding to one color. In an embodiment, the data driving circuit DIC1 outputs the test data voltage TEG_RR corresponding to a first color, and the data driving circuit DIC2 outputs the test data voltage TEG_GL corresponding to a second color.

In this case, the dummy pixel block DB1 includes four dummy pixels DPX_R, DPX_B, DPX_R, and DPX_B. That is, the dummy pixels DPX_R disposed adjacent to the short edge of the data driving circuit DIC1 correspond to the first color, and the dummy pixels DPX_B disposed adjacent to the data driving circuit DIC2 correspond to the second color. That is, the dummy pixels DPX_R are configured to emit the first color, and the dummy pixels DPX_B are configured to emit the second color.

FIG. 6 is a block diagram of a display device according to an embodiment of the present disclosure.

Referring to FIG. 6, the display device DD includes the display panel DP, the driving controller DC, the degradation detection circuit SSC, and the voltage generator VG.

The display panel DP includes the pixels PX, a scan driving circuit SDC, an emission driving circuit EDC, a data driver DDC, the dummy pixel group DPX_G, scan lines GIL1 to GILn, GRL1 to GRLn, and GWL1 to GWLn, emission lines EML1 to EMLn, and data lines DL1 to DLm.

In an embodiment, the pixels PX may be arranged in the active area AA, and the scan driving circuit SDC and the emission driving circuit EDC may be arranged in the peripheral area NAA.

Each of the plurality of pixels PX may be electrically connected with three scan lines and one emission line. In an embodiment, for example, as illustrated in FIG. 6, the pixels PX in the first row may be connected with the scan lines GIL1, GRL1, and GWL1 and the emission lines EML1. Also, the pixels PX in the i-th row may be connected with the scan lines GILi, GRLi, and GWLi and the emission line EMLi.

Each of the plurality of pixels PX includes a light emitting device ED (refer to FIG. 7) and a pixel circuit controlling the emission of the light emitting device ED. The pixel circuit may include one or more transistors and one or more capacitors. The scan driving circuit SDC and the emission driving circuit EDC may include transistors formed through the same process as the pixel circuit.

The driving controller DC receives the input image signal I_RGB and a control signal CTRL. The driving controller DC generates an output image signal O_RGB obtained by converting a data format of the input image signal I_RGB so as to be appropriate for the display panel DP. The driving controller DC outputs a scan control signal SCS, a data control signal DCS, and an emission control signal ECS.

The scan driving circuit SDC is disposed in the peripheral area NAA of the display panel DP so as to be adjacent to the active area AA. The scan lines GIL1 to GILn, GRL1 to GRLn, and GWL1 to GWLn extend from the scan driving circuit SDC in the first direction DR1.

The scan driving circuit SDC receives the scan control signal SCS from the driving controller DC. The scan driving circuit SDC may output scan signals to the scan lines GIL1 to GILn, GRL1 to GRLn, and GWL1 to GWLn in response to the scan control signal SCS.

The emission driving circuit EDC is disposed in the peripheral area NAA of the display panel DP so as to be adjacent to the active area AA. In an embodiment, the emission lines EML1 to EMLn extend from the emission driving circuit EDC in a direction opposite to the first direction DR1.

The emission driving circuit EDC receives the emission control signal ECS from the driving controller DC. The emission driving circuit EDC may output emission signals to the emission lines EML1 to EMLn in response to the emission control signal ECS.

The scan lines GIL1 to GILn, GRL1 to GRLn, and GWL1 to GWLn and the emission lines EML1 to EMLn are arranged to be spaced from each other in the second direction DR2.

In an example illustrated in FIG. 6, the scan driving circuit SDC and the emission driving circuit EDC are arranged to face each other, with the pixels PX interposed therebetween. However, the present disclosure is not limited thereto. For another example, each of the scan driving circuit SDC and the emission driving circuit EDC may be disposed in the peripheral area NAA so as to be adjacent to the active area AA of the display panel DP. In an embodiment, the scan driving circuit SDC and the emission driving circuit EDC may be implemented with one circuit.

The data driver DDC receives the data control signal DCS and the output image signal O_RGB from the driving controller DC. The data driver DDC converts the output image signal O_RGB into data signals and then outputs the data signals to the plurality of data lines DL1 to DLm. A voltage level of each of the data signals may correspond to a grayscale level of the output image signal O_RGB.

The data lines DL1 to DLm extend from the data driver DDC in a direction opposite to the second direction DR2 and are arranged to be spaced from each other in the first direction DR1.

The data driver DDC may include one or more data driving circuits. In an embodiment, the data driver DDC may include the data driving circuits DIC1 to DIC4 illustrated in FIGS. 3 and 4A.

The dummy pixel group DPX_G may be disposed adjacent to the data driver DDC. The dummy pixel group DPX_G may include the plurality of dummy pixels DPX. In an embodiment, the dummy pixel group DPX_G may include the dummy pixel blocks DB1, DB2, and DB3 illustrated in FIG. 3.

An example in which the dummy pixel group DPX_G is disposed on one side of the data driver DDC is illustrated in FIG. 6, but the present disclosure is not limited thereto. As described with reference to FIG. 3, each of the dummy pixel blocks DB1, DB2, and DB3 in the dummy pixel group DPX_G may be disposed between two data driving circuits adjacent to each other among the data driving circuits DIC1 to DIC4 so as to be adjacent to the short edge of each of the two data driving circuits. As the dummy pixel blocks DB1, DB2, and DB3 are disposed adjacent to the short edges of the data driving circuits DIC1 to DIC4, the dummy pixel blocks DB1, DB2, and DB3 do not hinder the placement of the data lines DL1 to DLm.

The degradation detection circuit SSC receives a sensing signal SS from the dummy pixel group DPX_G and output the compensation signal CC corresponding to the sensing signal SS. The compensation signal CC output from the degradation detection circuit SSC may be provided to the driving controller DC.

The voltage generator VG generates voltages for an operation of the display panel DP. In an embodiment, the voltage generator VG generates a first driving voltage ELVDD, a second driving voltage ELVSS, a reference voltage VREF, and an initialization voltage VINT.

Figure 7:
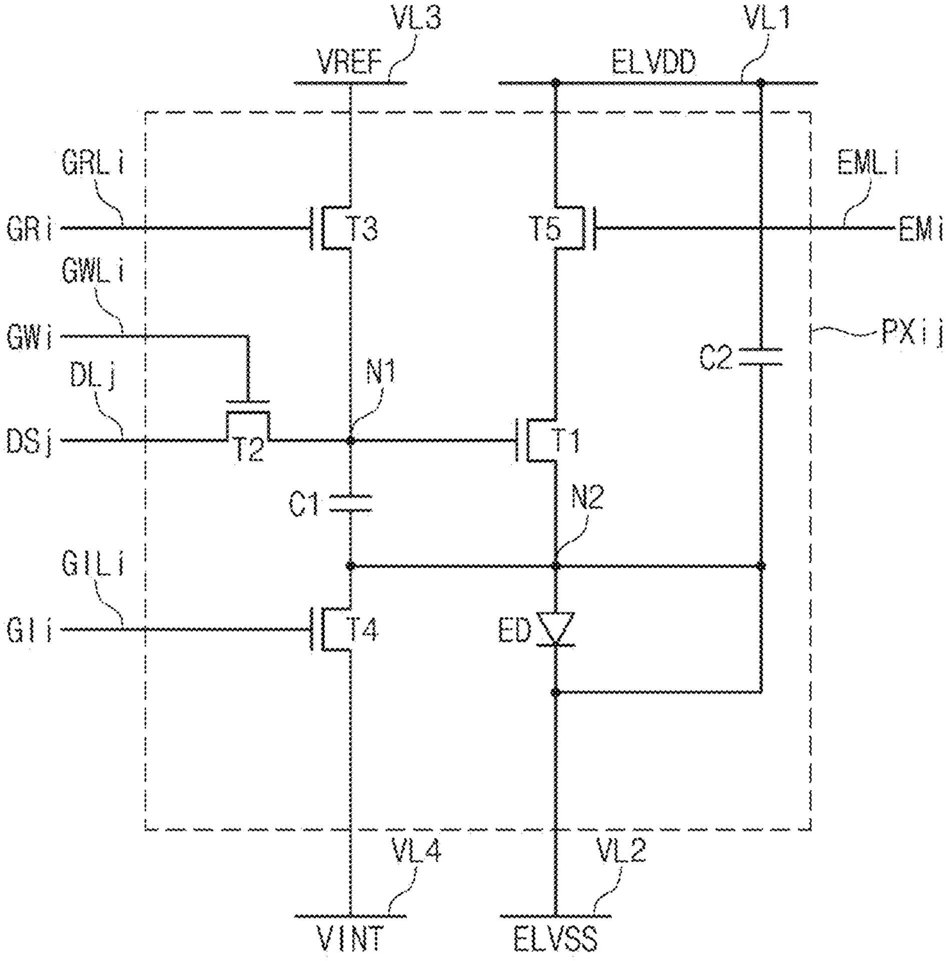
FIG. 7 is a circuit diagram of a pixel according to an embodiment of the present disclosure.

FIG. 7 is a circuit diagram of a pixel PXij according to an embodiment of the present disclosure.

The pixel PXij connected with i-th scan lines GILi, GRLi, and GWLi among the scan lines GIL1 to GILn, GRL1 to GRLn, and GWL1 to GWLn (refer to FIG. 6), an i-th emission line EMLi among the emission lines EML1 to EMLn (refer to FIG. 6), and a j-th data line DLj among the data lines DL1 to DLm (refer to FIG. 6) is illustrated in FIG. 6 as an example.

Each of the plurality of pixels PX illustrated in FIG. 6 may have the same circuit configuration as the pixel PXij illustrated in FIG. 7.

Referring to FIG. 7, the pixel PXij according to an embodiment includes a pixel circuit and at least one light emitting device ED. The pixel circuit may include first to fifth transistors T1, T2, T3, T4, and T5, a first capacitor C1, and a second capacitor C2. The light emitting device ED may be a light emitting diode. In an embodiment, an example in which one pixel PXij includes one light emitting device ED will be described.

In an embodiment, each of the first to fifth transistors T1 to T5 is an N-type transistor by using an oxide semiconductor as a semiconductor layer. However, the present disclosure is not limited thereto. In another embodiment, each of the first to fifth transistors T1 to T5 may be a P-type transistor having a low-temperature polycrystalline silicon ("LTPS") semiconductor layer. In another embodiment, at least one of the first to fifth transistors T1 to T5 may be an N-type transistor, and the remaining transistors may be P-type transistors. Also, the circuit configuration of the pixel PXij according to the present disclosure is not limited to the embodiment in FIG. 7. The number of transistors included in the pixel PXij, the number of capacitors included in the pixel PXij, and the connection relationship thereof may be variously changed or modified.

The scan lines GILi, GRLi, and GWLi may transfer scan signals GIi, GRi, and GWi, respectively, and the emission lines EMLi may transfer the emission signal EMi. The data line DLj transfers a data signal DSj. The data signal DSj may have a voltage level corresponding to the output image signal O_RGB output from the driving controller DC (refer to FIG. 6). First to fourth driving voltage lines VL1, VL2, VL3, and VL4 may transfer the first driving voltage ELVDD, the second driving voltage ELVSS, the reference voltage VREF, and the initialization voltage VINT, respectively.

The first transistor T1 is connected between the fifth transistor T5 and a second node N2 and includes a gate electrode connected with a first node N1.

The second transistor T2 is connected between the data line DLj and the first node N1 and includes a gate electrode connected with the scan line GWLi.

The third transistor T3 is connected between the third driving voltage line VL3 and the first node N1 and includes a gate electrode connected with the scan line GRLi.

The fourth transistor T4 is connected between the second node N2 and the fourth driving voltage line VL4 and includes a gate electrode connected with the scan line GILi.

The fifth transistor T5 is connected between the first driving voltage line VL1 and the first transistor T1 and includes a gate electrode connected with the emission line EMLi.

The first capacitor C1 is connected between the first node N1 and the second node N2. The second capacitor C2 is connected between the first driving voltage line VL1 and the second node N2.

The light emitting device ED is connected between the second node N2 and the second driving voltage line VL2.

During an initialization period, the third transistor T3 and the fourth transistor T4 are turned on. The first node N1 is initialized with the reference voltage VREF. The second node N2 is initialized with the initialization voltage VINT.

During a compensation period, the third transistor T3 and the fifth transistor T5 are turned on. A voltage corresponding to a threshold voltage of the first transistor T1 is provided to the first capacitor C1.

During a write period, the second transistor T2 is turned on. The second transistor T2 transfers a voltage corresponding to the data signal DSj to the first node N1. As a result, a difference between the voltage of the data signal DSj and the threshold voltage of the first transistor T1 may be charged by the first capacitor C1.

Afterwards during an emission period, the fifth transistor T5 is turned on. The first transistor T1 provides a current corresponding to the voltage stored in the first capacitor C1 to the light emitting device ED. The light emitting device ED may emit a light with luminance corresponding to the data signal DSj.

In an embodiment, each of the dummy pixels DPX illustrated in FIGS. 3 and 6 may include a circuit configuration identical or similar to the circuit configuration of the pixel PXij illustrated in FIG. 7.

In this case, each of the dummy pixels DPX may receive scan signals from the scan driving circuit SDC and may receive an emission signal from the emission driving circuit EDC.

In an embodiment, each of the dummy pixels DPX may include a resistor instead of the light emitting device ED. In this case, each of the dummy pixels DPX may not receive the scan signal and the emission signal from the scan driving circuit SDC and the emission driving circuit EDC and may directly receive the test data voltage as a data signal through the gate electrode of the first transistor T1.

Each of the dummy pixels DPX may receive the test data voltage as a data signal from a corresponding data driving circuit among the data driving circuits DIC1 to DIC4. In an embodiment, each of the dummy pixels DPX may output a current of the second node N2 as the sensing signal SS.

As the operating time of the display device DD (refer to FIG. 1) increases, the characteristics of the light emitting device ED and the first to fifth transistors T1 to T5 of the pixel PXij may change. In particular, in the case where the characteristics of the light emitting device ED and the first transistor T1 supplying a current to the light emitting device ED change, the luminance of the pixel PXij may also change. That is, even though the predetermined data signal DSj is provided to the pixel PXij, the luminance of the pixel PXij may vary depending on the operating time of the display device DD (refer to FIG. 1).

Referring to FIG. 6, the driving controller DC may predict a characteristic change of the pixels PX depending on the operating time of the display device DD and may output the output image signal O_RGB applying the compensation for the predicted characteristic change.

However, a value of predicting the characteristic change of the pixels PX may be different from an actual characteristic variation.

When the dummy pixels DPX operate under a condition similar to the operating condition of the pixels PX, the dummy pixels DPX may be degraded to be similar to the pixels PX. The degradation detection circuit SSC may measure the degree of degradation of the pixels PX based on the sensing signal SS received from the dummy pixels DPX.

As one of methods that allow the dummy pixels DPX to operate under a condition similar to the operating condition of the pixels PX, a data signal that is identical to the data signal provided to the pixels PX may be provided to the dummy pixels DPX.

In this case, the data driver DDC may provide the test data voltage to the dummy pixels DPX, and the driving controller DC may provide the data driver DDC with information about the voltage level of the test data voltage. In an embodiment, the data control signal DCS may include the information about the voltage level of the test data voltage.

The data driver DDC may provide the test data voltage to the dummy pixels DPX based on the information about the voltage level of the test data voltage, which is included in the data control signal DCS.

Figure 8A:
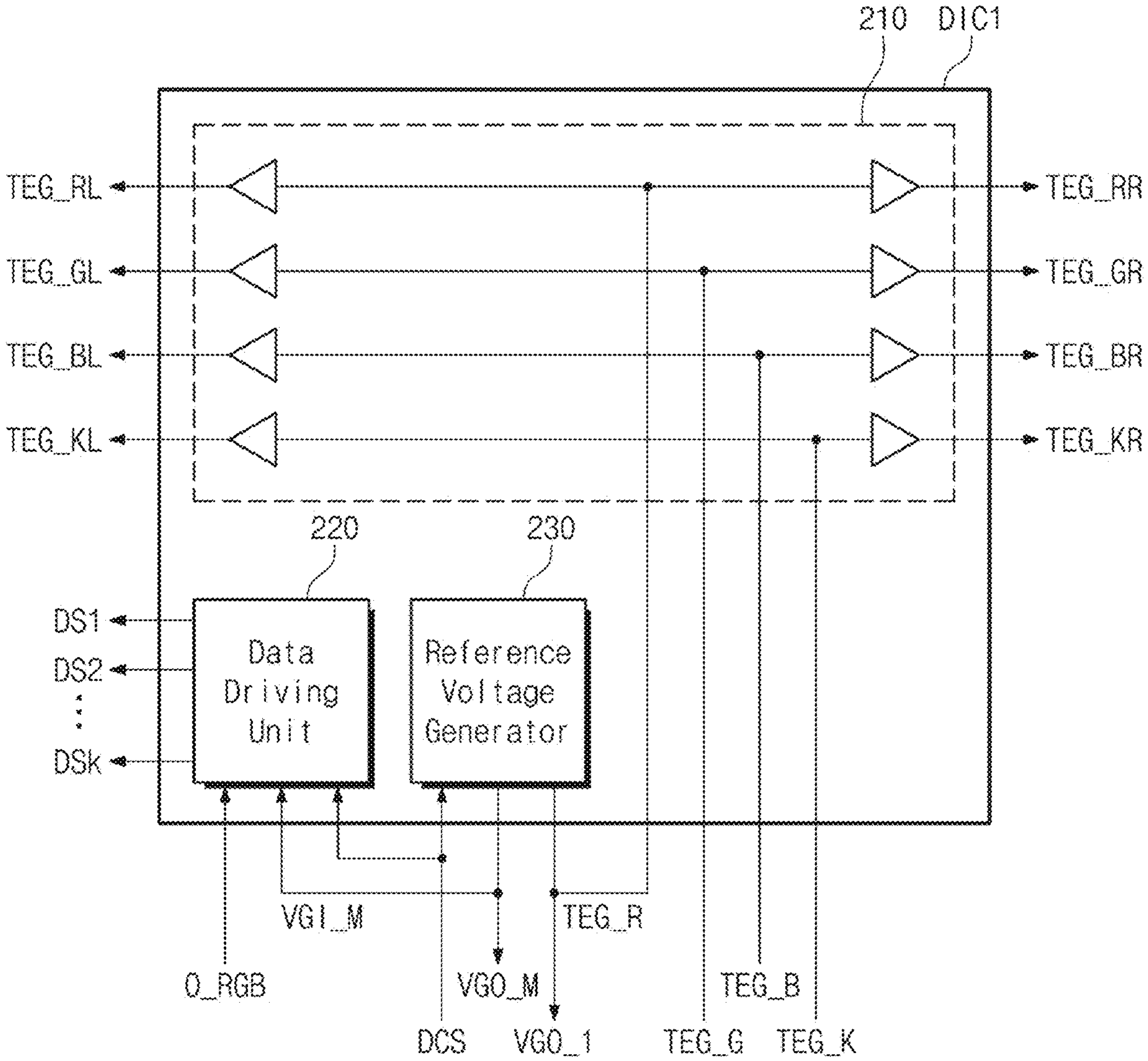
FIG. 8A is a diagram illustrating a circuit configuration of a data driving circuit according to an embodiment of the present disclosure.

FIG. 8A is a diagram illustrating a circuit configuration of the data driving circuit DIC1 according to an embodiment of the present disclosure.

Referring to FIGS. 4A and 8A, the data driving circuit DIC1 includes an output circuit 210, a data driving unit 220, and a reference voltage generator 230.

The output circuit 210 outputs the test data voltages TEG_RL, TEG_GL, TEG_BL, TEG_KL, TEG_RR, TEG_GR, TEG_BR, and TEG_KR based on the first input voltage TEG_R, the second input voltage TEG_G, the third input voltage TEG_B, and the fourth input voltage TEG_K.

The output circuit 210 may include buffers that receive the first input voltage TEG_R, the second input voltage TEG_G, the third input voltage TEG_B, and the fourth input voltage TEG_K and output the test data voltages TEG_RL, TEG_GL, TEG_BL, TEG_KL, TEG_RR, TEG_GR, TEG_BR, and TEG_KR.

In an embodiment, each of the test data voltages TEG_RL and TEG_RR output from the data driving circuit DIC1 may have the same voltage level as the first input voltage TEG_R.

In an embodiment, each of the test data voltages TEG_GL and TEG_GR output from the data driving circuit DIC1 may have the same voltage level as the second input voltage TEG_G.

In an embodiment, each of the test data voltages TEG_BL and TEG_BR output from the data driving circuit DIC1 may have the same voltage level as the third input voltage TEG_B.

In an embodiment, each of the test data voltages TEG_KL and TEG_KR output from the data driving circuit DIC1 may have the same voltage level as the fourth input voltage TEG_K.

The reference voltage generator 230 generates the gamma reference voltage VGO_M and the test reference voltage VGO_1 in response to the data control signal DCS provided from the driving controller DC (refer to FIG. 6). The gamma reference voltage VGO_M generated by the reference voltage generator 230 may be provided to the data driving circuits DIC2, DIC3, and DIC4 as well as the data driving unit 220 of the data driving circuit DIC1.

The test reference voltage VGO_1 generated by the reference voltage generator 230 may be provided to the output circuit 210 as the first input voltage TEG_R.

The test reference voltage VGO_1 generated by the reference voltage generator 230 may be provided to the data driving circuits DIC2, DIC3, and DIC4 as well as the output circuit 210 of the data driving circuit DIC1.

The data driving unit 220 receives the data control signal DCS and the output image signal O_RGB from the driving controller DC (refer to FIG. 6) and receives the gamma reference voltage VGO_M from the reference voltage generator 230. The data driving unit 220 outputs the data signals DS1, DS2, DSk. The data signals DS1, DS2, . . . , DSk may be provided to some of the data lines DL1, DL2, DLm illustrated in FIG. 6. In an embodiment, "k" may be smaller than "m". When the number of data driving circuits DIC1 to DIC4 is "4", "k" is "m/4". "k" and "m" are natural numbers.

Each of the data driving circuits DIC2, DIC3, and DIC4 illustrated in FIG. 4A may have a circuit configuration similar to a circuit configuration of the data driving circuit DIC1 illustrated in FIG. 8A. Because the data driving circuit DIC1 illustrated in FIG. 8A is a master, the data driving circuit DIC1 outputs the gamma reference voltage VGO_M. Because each of the data driving circuits DIC2, DIC3, and DIC4 is a slave, each of the data driving circuits DIC2, DIC3, and DIC4 does not output the gamma reference voltage VGO_M.

The test reference voltages VGO_1 that are output from the data driving circuits DIC1, DIC2, DIC3, and DIC4, respectively, may correspond to a first color, a second color, a third color, and a fourth color, respectively. The first color, the second color, the third color, and the fourth color may be a red, a green, a blue, and a black, respectively, but the present disclosure is not limited thereto. That is, for example, the test reference voltage VGO_1 that is output from the data driving circuit DIC1 is for controlling a dummy pixel configured to emit the first color.

In an embodiment, to make the degradation speed of the dummy pixels DPX high, the reference voltage generator 230 may output, as the test reference voltage VGO_1, a voltage level corresponding to the highest grayscale level among grayscale levels of the data signals DS1 to DSk.

Figure 8B:
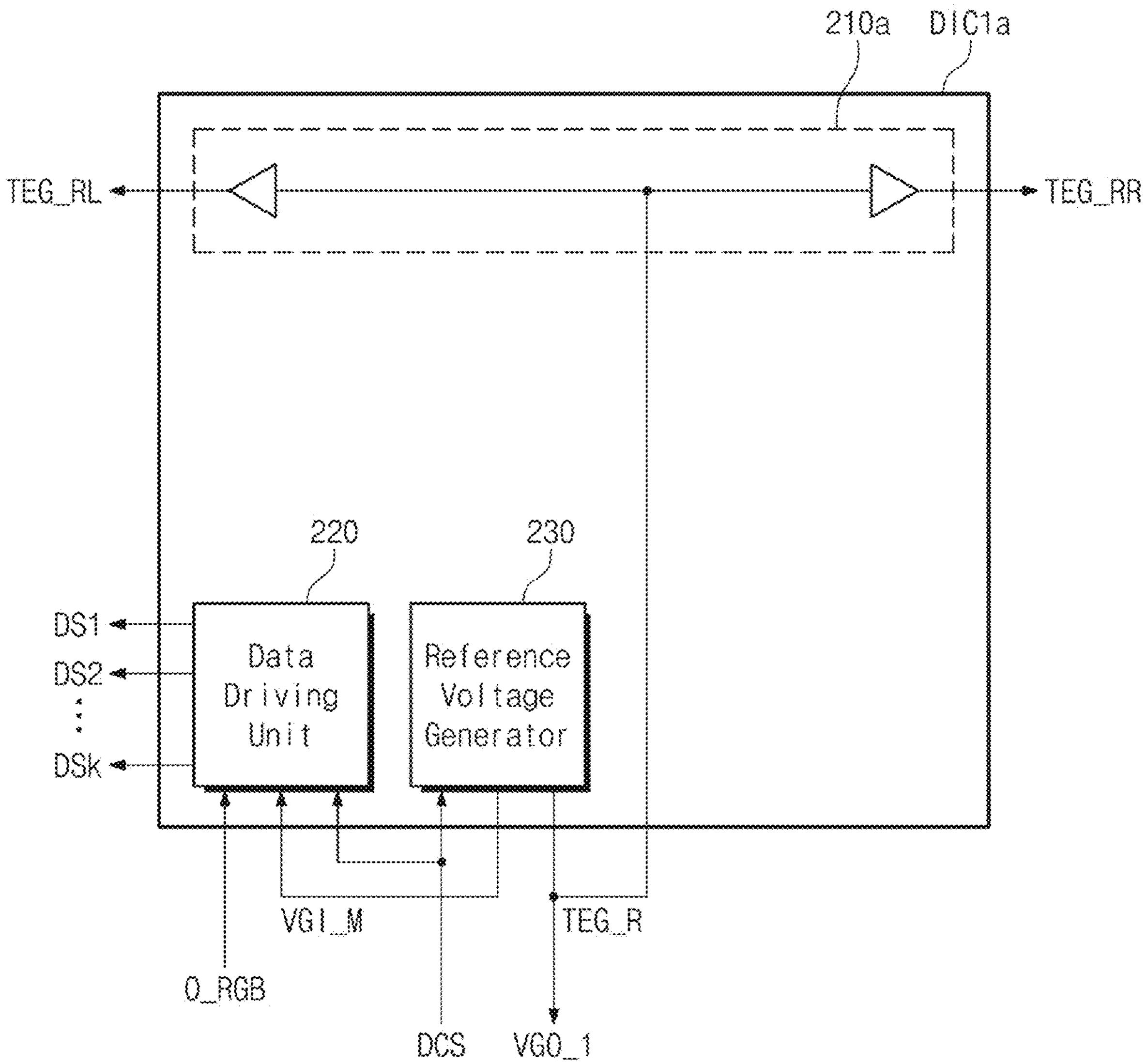
FIG. 8B is a diagram illustrating a circuit configuration of a data driving circuit according to another embodiment of the present disclosure.

FIG. 8B is a diagram illustrating a circuit configuration of the data driving circuit DIC1*a* according to another embodiment of the present disclosure.

A configuration of the data driving circuit DIC1*a* illustrated in FIG. 8B is similar to the configuration of the data driving circuit DIC1 illustrated in FIG. 8A, and thus, additional description will be omitted to avoid redundancy.

When the display device DD (refer to FIG. 2) includes two or more data driving circuits, for example, when the display device DD includes four data driving circuits DIC1, DIC2, DIC3, and DIC4 illustrated in FIG. 3, the data driving circuits DIC1, DIC2, DIC3, and DIC4 may operate independently of each other without a master-slave relationship.

The reference voltage generator 230 outputs the test reference voltage VGO_1. An output circuit 210*a* receives the test reference voltage VGO_1 as the first input voltage TEG_R. The output circuit 210*a* may output the test data voltages TEG_RL and TEG_RR based on the first input voltage TEG_R.

Each of the data driving circuits DIC1, DIC2, DIC3, and DIC4 illustrated in FIG. 3 may include the same circuit configuration as the data driving circuit DIC1*a* illustrated in FIG. 8B.

In this case, the data driving circuit DIC1 outputs the test data voltages TEG_RL and TEG_RR corresponding to the first color; the data driving circuit DIC2 outputs the test data voltages TEG_GL and TEG_GR corresponding to the second color; the data driving circuit DIC3 outputs the test data voltages TEG_BL and TEG_BR corresponding to the third color; the data driving circuit DIC4 outputs the test data voltages TEG_KL and TEG_KR corresponding to the fourth color.

In this case, the dummy pixels DPX adjacent to the data driving circuit DIC1 from among the dummy pixels DPX of the dummy pixel block DB1 may correspond to the first color. The dummy pixels DPX adjacent to the data driving circuit DIC2 from among the dummy pixels DPX of the dummy pixel block DB1 and the dummy pixel block DB2 may correspond to the second color. The dummy pixels DPX adjacent to the data driving circuit DIC3 from among the dummy pixels DPX of the dummy pixel block DB2 and the dummy pixel block DB3 may correspond to the third color. The dummy pixels DPX adjacent to the data driving circuit DIC4 from among the dummy pixels DPX of the dummy pixel block DB3 may correspond to the fourth color.

That is, as illustrated in FIG. 5B, the dummy pixels DPX_R receives the test data voltage TEG_RR through the voltage line RVL from the data driving circuit DIC1 disposed adjacent thereto. The dummy pixels DPX_G receives the test data voltage TEG_GL through the voltage line GVL from the data driving circuit DIC2 disposed adjacent thereto.

Figure 8C:
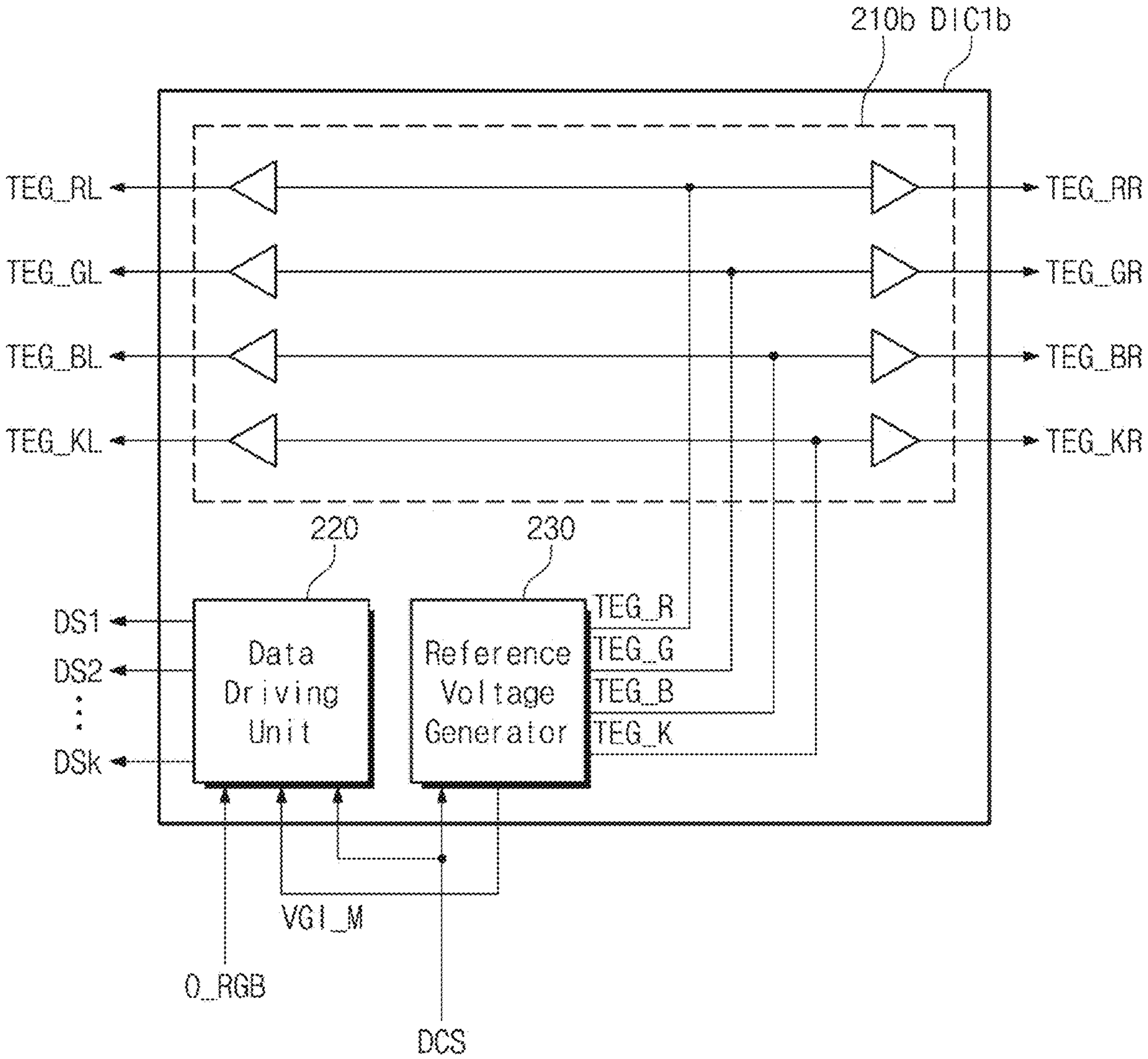
FIG. 8C is a diagram illustrating a circuit configuration of a data driving circuit according to still another embodiment of the present disclosure.

FIG. 8C is a diagram illustrating a circuit configuration of a data driving circuit DIC1*b* according to still another embodiment of the present disclosure.

A configuration of the data driving circuit DIC1*b* illustrated in FIG. 8C is similar to the configuration of the data driving circuit DIC1 illustrated in FIG. 8A, and thus, additional description will be omitted to avoid redundancy.

When the display device DD (refer to FIG. 2) includes two or more data driving circuits, for example, when the display device DD includes four data driving circuits DIC1, DIC2, DIC3, and DIC4 illustrated in FIG. 3, the data driving circuits DIC1, DIC2, DIC3, and DIC4 may operate independently of each other without a master-slave relationship.

The reference voltage generator 230 may output the first input voltage TEG_R, the second input voltage TEG_G, the third input voltage TEG_B, and the fourth input voltage TEG_K.

An output circuit 210*b* may output the test data voltages TEG_RL, TEG_GL, TEG_BL, TEG_KL, TEG_RR, TEG_GR, TEG_BR, and TEG_KR based on the first input voltage TEG_R, the second input voltage TEG_G, the third input voltage TEG_B, and the fourth input voltage TEG_K.

That is, without receiving voltages from the remaining data driving circuits DIC2, DIC3, and DIC4 (refer to FIG. 3), the output circuit 210*b* may output the test data voltages TEG_RL, TEG_GL, TEG_BL, TEG_KL, TEG_RR, TEG_GR, TEG_BR, and TEG_KR based on the first input voltage TEG_R, the second input voltage TEG_G, the third input voltage TEG_B, and the fourth input voltage TEG_K that are generated within the data driving circuit DIC1*b* (e.g., by the reference voltage generator 230).

The data driving unit 220 may directly receive the master input voltage VGI_M generated by the reference voltage generator 230 of the same data driving circuit. In this case, the master input voltage VGI_M generated by the reference voltage generator 230 may be directly transferred to the data driving unit 220 inside the data driving circuit DIC1*b* without passing through the flexible circuit film FCB1.

In another embodiment, the voltage generator VG illustrated in FIG. 2 may provide the master input voltage VGI_M. In this case, the data driving unit 220 may receive the master input voltage VGI_M provided from the voltage generator VG.

Each of the data driving circuits DIC1, DIC2, DIC3, and DIC4 illustrated in FIG. 3 may include the same circuit configuration as the data driving circuit DIC1*b* illustrated in FIG. 8C.

In an embodiment, the display device DD (refer to FIG. 3) may include only one data driving circuit. In this case, also, the one data driving circuit may include the same circuit configuration as the data driving circuit DIC1*b* illustrated in FIG. 8C.

Even though FIGS. 8A to 8C are illustrated as the test data voltages TEG_RL, TEG_GL, TEG_BL, TEG_KL, TEG_RR, TEG_GR, TEG_BR, and TEG_KR and the data signals DS1 to DSk are output through the same edge or the opposite edge of the data driving circuit (e.g., IDC1), in another embodiment the test data voltages TEG_RL, TEG_GL, TEG_BL, TEG_KL, TEG_RR, TEG_GR, TEG_BR, and TEG_KR may be output from the short edges of the data driving circuit while the data signals DS1 to DSk may be output from the long edge of the data driving circuit.

Figure 9:
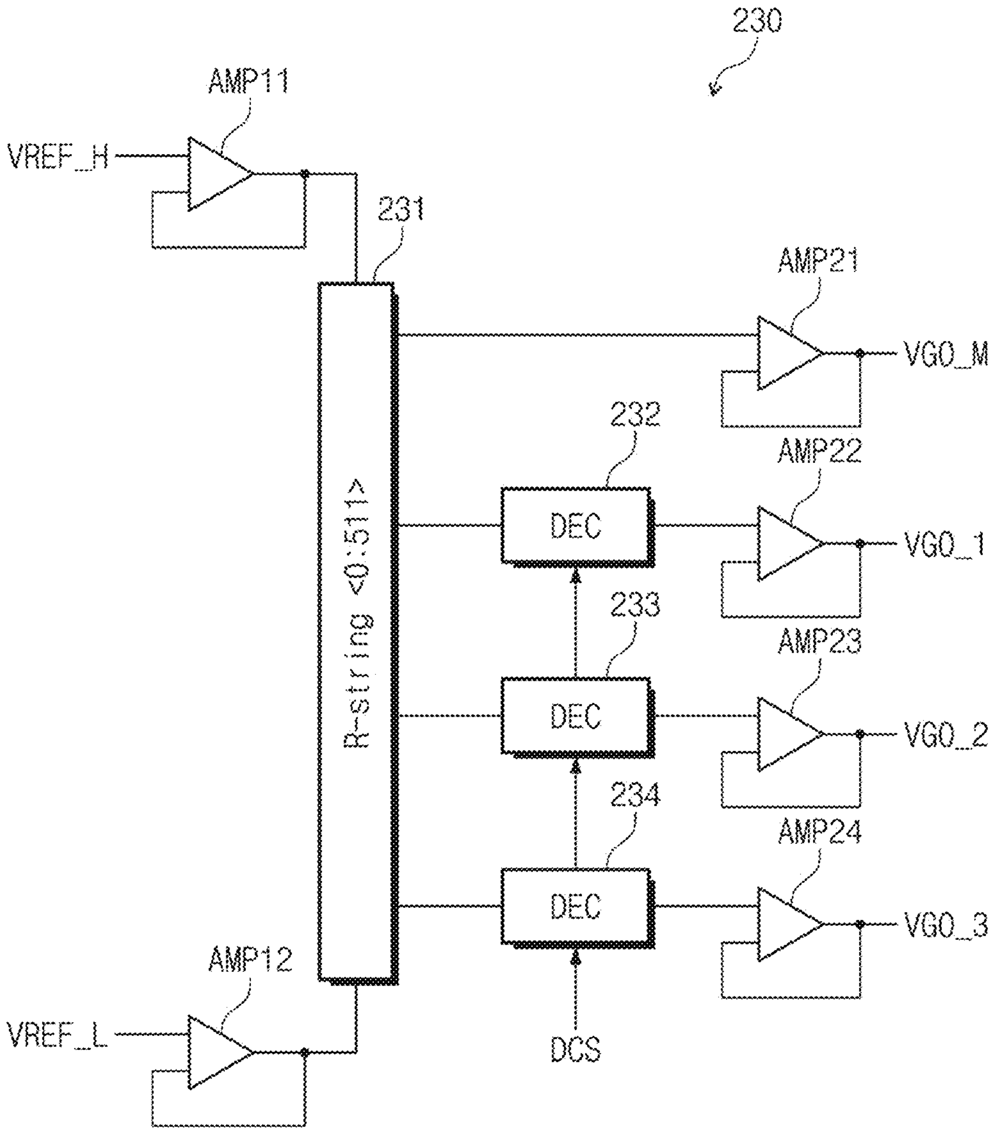
FIG. 9 is a circuit diagram of a reference voltage generator according to an embodiment of the present disclosure.

FIG. 9 is a circuit diagram of the reference voltage generator 230 according to an embodiment of the present disclosure.

Referring to FIG. 9, the reference voltage generator 230 include input amplifiers AMP11 and AMP12, a resistor string 231, decoders 232, 233, and 234, and output amplifiers AMP21, AMP22, AMP23, and AMP24.

The input amplifier AMP11 receives an upper limit reference voltage VREF_H. The input amplifier AMP12 receives a lower limit reference voltage VREF_L.

The resistor string 231 is connected between an output terminal of the input amplifier AMP11 and an output terminal of the input amplifier AMP12. In an embodiment, the resistor string 231 may output 512 different voltages between the upper limit reference voltage VREF_H and the lower limit reference voltage VREF_L.

The output amplifier AMP21 outputs one of the voltages from the resistor string 231 as the gamma reference voltage VGO_M.

Each of the decoders 232, 233, and 234 selects one of voltages from the resistor string 231 based on the information about the voltage level of the test data voltage, which is included in the data control signal DCS.

The output amplifier AMP22 outputs the voltage selected by the decoder 232 as the test reference voltage VGO_1.

The output amplifier AMP23 outputs the voltage selected by the decoder 233 as the test reference voltage VGO_2.

The output amplifier AMP24 outputs the voltage selected by the decoder 234 as the test reference voltage VGO_3.

In the example illustrated in FIG. 8A, the reference voltage generator 230 outputs one test reference voltage VGO_1; in some cases, the reference voltage generator 230 may output the test reference voltages VGO_1 and VGO_2.

The data driving unit 220 illustrated in FIG. 8A may adjust voltage levels of the data signals DS1, DS2, DSk based on the gamma reference voltage VGO_M received from the reference voltage generator 230.

Figure 10:
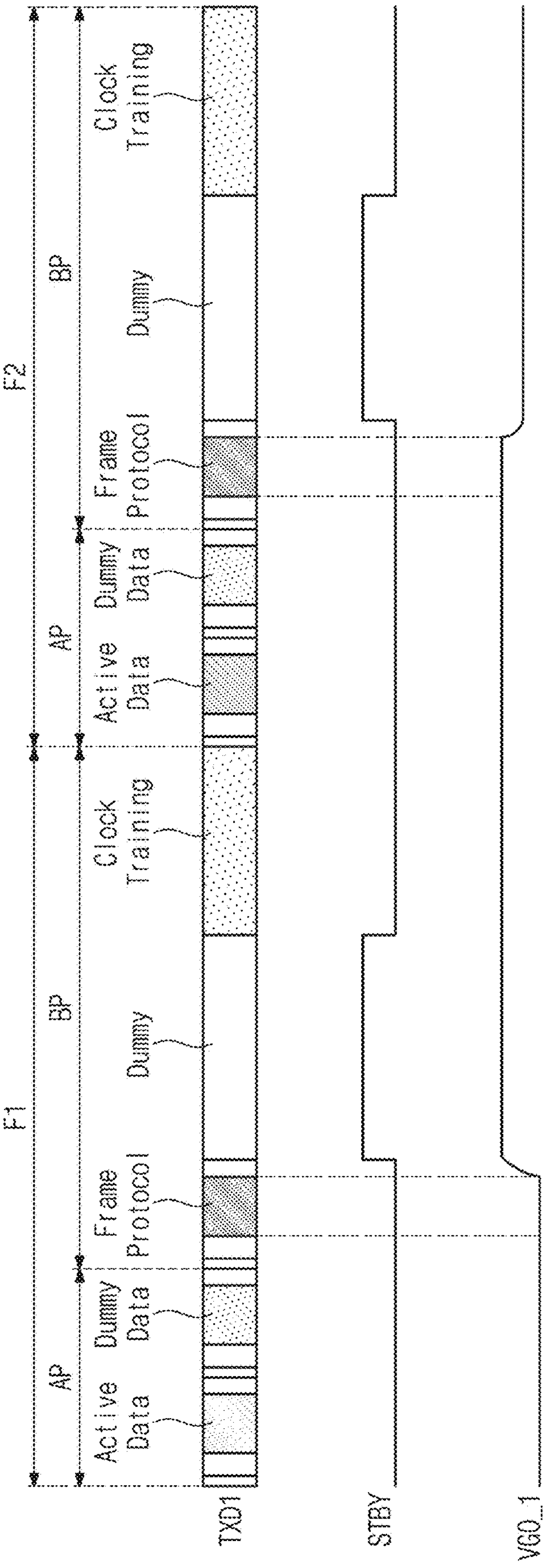
FIG. 10 is a diagram illustrating a signal and a test data voltage provided from a driving controller to a data driving circuit.

FIG. 10 is a diagram illustrating a signal and a test data voltage provided from the driving controller DC to the data driving circuit DIC1.

Referring to FIGS. 6 and 10, the driving controller DC provides a transmission signal TXD1 to the data driving circuit DIC1 while a standby signal STBY is at the low level. Only the transmission signal TXD1 that is provided from the driving controller DC to the data driving circuit DIC1 is illustrated in FIG. 10. Even though omitted in FIG. 10, transmission signals that are provided from the driving controller DC to the data driving circuits DIC2, DIC3, and DIC4, respectively, may be similar to the transmission signal TXD1 illustrated in FIG. 10.

Each of frames F1 and F2 may include one active period AP and one blank period BP. The active period AP may refer to a period in which the pixels PX of the active area AA are driven, and the blank period BP may refer to a vertical blank period.

The driving controller DC provides the data driving circuit DIC1 with the transmission signal TXD1 including active data and dummy data during the active period AP of each of the frames F1 and F2. The output image signal O_RGB may include the active data to be provided to the pixels PX of the active area AA.

The driving controller DC provides the data driving circuit DIC1 with the transmission signal TXD1 including a frame protocol and clock training during the blank period BP of each of the frames F1 and F2.

The frame protocol may include information about an operating characteristic of the data driving circuit DIC1. In an embodiment, for example, the frame protocol may include information about an operating frequency, information about a voltage level of the test reference voltage VGO_1, etc. The data control signal DCS may include the frame protocol.

The decoder 232 (refer to FIG. 9) of the data driving circuit DIC1 selects one of voltages from the resistor string 231 based on the information about the voltage level of the test reference voltage VGO_1, which is included in the frame protocol, that is, the data control signal DCS.

As a result, the reference voltage generator 230 (refer to FIG. 9) of the data driving circuit DIC1 may output the test reference voltage VGO_1 having a given voltage level under control of the driving controller DC.

The test reference voltage VGO_1 may be maintained at a given level from the blank period BP of the frame F1 to the active period AP of the frame F2. In the blank period BP of the frame F2, the voltage level of the test reference voltage VGO_1 may be changed depending on the information about the voltage level of the test reference voltage VGO_1 included in the frame protocol received from the driving controller DC.

Figure 11:
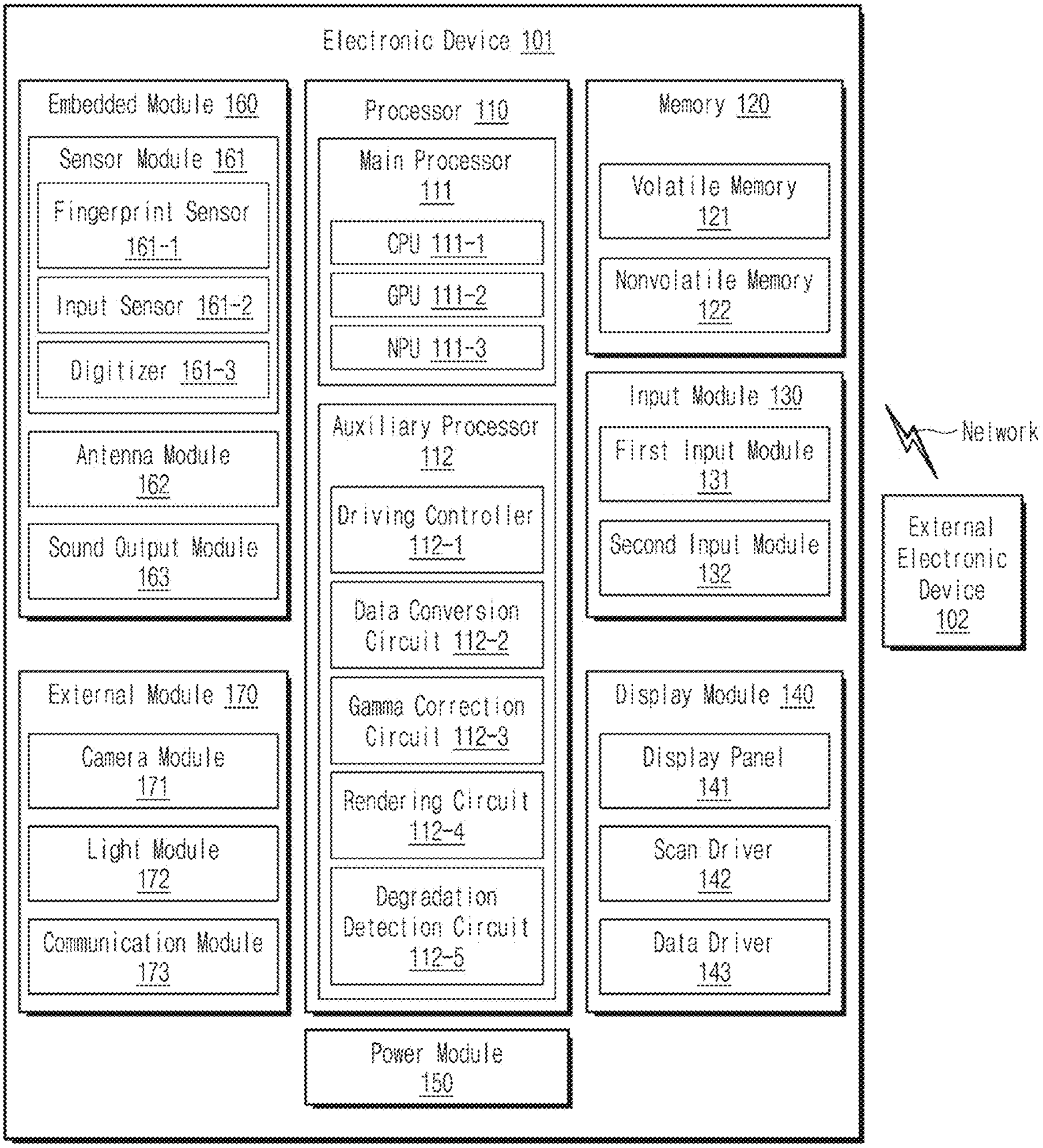
FIG. 11 is a block diagram of an electronic device, according to an embodiment of the present disclosure.

FIG. 11 is a block diagram of an electronic device according to an embodiment of the present disclosure.

Referring to FIG. 11, an electronic device 101 outputs a variety of information through a display module 140 in an operating system. When a processor 110 executes an application stored in a memory 120, the display module 140 provides the user with application information through a display panel 141.

The processor 110 obtains an external input through an input module 130 or a sensor module 161 and executes an application corresponding to the external input. In an embodiment, for example, when the user selects a camera icon displayed in the display panel 141, the processor 110 obtains the user input through an input sensor 161-2 and activates a camera module 171. The processor 110 transfers image data corresponding to a photographed image obtained through the camera module 171 to the display module 140. The display module 140 may display an image corresponding to the photographed image through the display panel 141.

As another example, when authentication for personal information is performed in the display module 140, a fingerprint sensor 161-1 obtains the input fingerprint information as input data. The processor 110 compares the input data obtained through the fingerprint sensor 161-1 and authentication data stored in the memory 120 and executes an application depending on a comparison result. The display module 140 may display information executed depending on logic of the application, through the display panel 141.

As another example, when the user selects a music streaming icon displayed in the display module 140, the processor 110 obtains the user input through the input sensor 161-2 and activates a music streaming application stored in the memory 120. When a music play command is input to the music streaming application, the processor 110 activates a sound output module 163 and provides the user with sound information corresponding to the music play command.

The operation of the electronic device 101 is briefly described above. Below, a configuration of the electronic device 101 will be described in detail. Some of components of the electronic device 101 to be described later may be integrally implemented with one component, and the one component may be divided into two or more components.

Referring to FIG. 11, the electronic device 101 may communicate with an external electronic device 102 over a network (e.g., a short-range wireless communication network or a long-range wireless communication network). According to an embodiment, the electronic device 101 may include the processor 110, the memory 120, the input module 130, the display module 140, a power module 150, an embedded module (or an internal module) 160, and an external module 170. According to an embodiment, the electronic device 101 may not include at least one of the above components or may further include one or more other components. According to an embodiment, some of the above components (e.g., the sensor module 161, an antenna module 162, or the sound output module 163) may be integrated into any other component (e.g., the display module 140).

The processor 110 may execute software to control at least one component (e.g., a hardware or software component) of the electronic device 101 connected with the processor 110 and may perform various data processing or operations. According to an embodiment, as at least a part of the data processing or operations, the processor 110 may store a command or data received from any other component (e.g., the input module 130, the sensor module 161, or a communication module 173) in a volatile memory 121, may process the command or data stored in the volatile memory 121, and may store the processed data in a nonvolatile memory 122.

The processor 110 may include a main processor 111 and an auxiliary processor 112. The main processor 111 may include one or more of a central processing unit ("CPU") 111-1 or an application processor ("AP"). The main processor 111 may further include one or more of a graphic processing unit ("GPU") 111-2, a communication processor ("CP"), and an image signal processor ("ISP"). The main processor 111 may further include a neural processing unit ("NPU") 111-3. The neural processing unit 111-3 may be a processor specialized for processing of an artificial intelligence model, and the artificial intelligence model may be created through machine learning. The artificial intelligence model may include a plurality of artificial neural network layers. The artificial neural network may include one of a deep neural network ("DNN"), a convolutional neural network ("CNN"), a recurrent neural network ("RNN"), a restricted boltzmann machine ("RBM"), a deep belief network ("DBN"), a bidirectional recurrent deep neural network ("BRDNN"), a deep Q-network, or a combination of two or more thereof, but the present disclosure is not limited thereto. Additionally or alternatively, the artificial intelligence model may include a software structure in addition to a hardware structure. At least two of the above processing units and processors may be integrally implemented with one component (e.g., a single chip), or each of the above processing units and processors may be implemented with an independent component (e.g., a plurality of chips).

The auxiliary processor 112 may include a driving controller 112-1. The driving controller 112-1 may include an interface conversion circuit and a timing control circuit. The driving controller 112-1 receives an image signal from the main processor 111 and outputs image data obtained by converting a data format of the image signal so as to be suitable for the specification of an interface with the display module 140. The driving controller 112-1 may output various kinds of control signals to drive the display module 140.

The auxiliary processor 112 may further include a data conversion circuit 112-2, a gamma correction circuit 112-3, a rendering circuit 112-4, a degradation detection circuit 112-5, etc. The data conversion circuit 112-2 may receive image data from the driving controller 112-1; the data conversion circuit 112-2 may compensate for the image data such that an image is displayed with a desired luminance depending on a characteristic of the electronic device 101 or user settings or may convert the image data to reduce power consumption or to compensate for afterimages. The gamma correction circuit 112-3 may convert the image data or the gamma reference voltage such that an image displayed on the electronic device 101 has a desired gamma characteristic. The rendering circuit 112-4 may receive the image data from the driving controller 112-1 and may render the image data in consideration of a pixel arrangement of the display panel 141 applied to the electronic device 101. At least one of the data conversion circuit 112-2, the gamma correction circuit 112-3, and the rendering circuit 112-4 may be integrated into any other component (e.g., the main processor 111 or the driving controller 112-1). At least one of the data conversion circuit 112-2, the gamma correction circuit 112-3, and the rendering circuit 112-4 may be integrated into a data driver 143 to be described later.

The memory 120 may stores various data used by at least one component (e.g., the processor 110 or the sensor module 161) of the electronic device 101 and input data or output data for commands related thereto. The memory 120 may include at least one of the volatile memory 121 and the nonvolatile memory 122.

The input module 130 may receive a command or data to be used by a component (e.g., the processor 110, the sensor module 161, or the sound output module 163) of the electronic device 101 from the outside of the electronic device 101 (e.g., the user or the external electronic device 102).

The input module 130 may include a first input module 131 to which a command or data are input from the user and a second input module 132 to which a command or data are input from the external electronic device 102. The first input module 131 may include a microphone, a mouse, a keyboard, a key (e.g., a button), or a pen (e.g., a passive pen or an active pen). The second input module 132 may support a specified protocol capable of connecting to the external electronic device 102 by wire or wirelessly. According to one embodiment, the second input module 132 may include a high definition multimedia interface ("HDMI"), a universal serial bus ("USB") interface, a secure digital ("SD") card interface, or an audio interface. The second input module 132 may include a connector capable of being physically connected with the external electronic device 102, for example, an HDMI connector, a USB connector, an SD card connector, or an audio connector (e.g., a headphone connector).

The display module 140 visually provides information to the user. The display module 140 may include the display panel 141, a scan driver 142, and the data driver 143. The display module 140 may further include a window, a chassis, and a bracket for protecting the display panel 141.

The display panel 141 may include a liquid crystal display panel, an organic light emitting display panel, or an inorganic light emitting display panel, and a kind of the display panel 141 is not particularly limited. The display panel 141 may be of a rigid type or may be of a flexible type capable of being rolled or folded. The display module 140 may further include a supporter supporting the display panel 141, a bracket, a heat radiation member, etc.

The scan driver 142 that is a driving chip may be mounted in the display panel 141. Also, the scan driver 142 may be integrated into the display panel 141. In an embodiment, for example, the scan driver 142 may include an Amorphous Silicon ("ASG") TFT gate driver circuit, a Low Temperature Polycrystalline Silicon ("LTPS") TFT gate driver circuit, or an Oxide Semiconductor ("OSG") TFT gate driver circuit built in the display panel 141. The scan driver 142 receives a scan control signal from the driving controller 112-1 and output scan signals to the display panel 141 in response to a control signal.

The display panel 141 may further include an emission driver. The emission driver outputs an emission control signal to the display panel 141 in response to a control signal received from the driving controller 112-1. The emission driver may be formed independently of the scan driver 142 or may be integrated into the scan driver 142.

The data driver 143 receives a data control signal from the driving controller 112-1; the data driver 143 converts image data into an analog voltage (e.g., a data voltage) in response to the control signal and outputs data voltages to the display panel 141.

The data driver 143 may be integrated into any other component (e.g., the driving controller 112-1). The functions of the interface conversion circuit and the timing control circuit of the driving controller 112-1 described above may be integrated into the data driver 143.

The display module 140 may further include an emission driver, a voltage generation circuit, etc. The voltage generation circuit may output various kinds of voltages to drive the display panel 141.

The power module 150 supplies a power to the components of the electronic device 101. The power module 150 may include a battery that charges a power supply voltage. The battery may include a primary cell not recharged, a secondary cell rechargeable, or a fuel cell. The power module 150 may include a power management integrated circuit ("PMIC"). The PMIC supplies a power optimized for each of the modules described above and modules to be described later. The power module 150 may include a wireless power transmission/reception member electrically connected with the battery. The wireless power transmission/reception member may include a plurality of antenna radiators that are in the form of a coil.

The driving controller DC, the degradation detection circuit SSC, the voltage generator VG, the scan driving circuit SDC, the data driver DDC, and the display panel DP illustrated in FIG. 6 may correspond to the driving controller, the degradation detection circuit 112-5, the power module 150, the scan driver 152, the data driver 143, and the display panel 141 illustrated in FIG. 11, respectively.

The electronic device 101 may further include the embedded module 160 and the external module 170. The embedded module 160 may include the sensor module 161, the antenna module 162, and the sound output module 163. The external module 170 may include the camera module 171, a light module 172, and the communication module 173.

The sensor module 161 may sense an input by a user's body or an input by a pen among the first input module 131 and may generate an electrical signal or a data value corresponding to the input. The sensor module 161 may include at least one or more of the fingerprint sensor 161-1, the input sensor 161-2, and a digitizer 161-3.

The fingerprint sensor 161-1 may generate a data value corresponding to the user's fingerprint. The fingerprint sensor 161-1 may include one of an optical fingerprint sensor or a capacitive fingerprint sensor.

The input sensor 161-2 may generate a data value corresponding to coordinate information of the input by the user's body or the input by the pen. The input sensor 161-2 generates a capacitance change due to the input as a data value. The input sensor 161-2 may sense the input by the passive pen or may exchange data with the active pen.

The input sensor 161-2 may measure a biometric signal such as blood pressure, moisture, or body fat. For example, when the user touches his/her body part to a sensor layer or a sensing panel and does not move during a given time period, the input sensor 161-2 may detect the biometric signal based on a change in an electric field caused by the body part and may output the information desired by the user to the display module 140.

The digitizer 161-3 may generate a data value corresponding to the coordinate information of the input by the pen. The digitizer 161-3 generates the amount of electromagnetic change by the input as a data value. The digitizer 161-3 may sense the input by the passive pen or may exchange data with the active pen.

At least one of the fingerprint sensor 161-1, the input sensor 161-2, and the digitizer 161-3 may be implemented with a sensor layer formed on the display panel 141 through a continuous process. The fingerprint sensor 161-1, the input sensor 161-2, and the digitizer 161-3 may be disposed above/on the display panel 141, and at least one of the fingerprint sensor 161-1, the input sensor 161-2, and the digitizer 161-3, for example, the digitizer 161-3 may be disposed below/under the display panel 141.

At least two or more of the fingerprint sensor 161-1, the input sensor 161-2, and the digitizer 161-3 may be integrally formed with one sensing panel through the same process. When they are integrally formed with one sensing panel, the sensing panel may be disposed between the display panel 141 and the window disposed above/on the display panel 141. According to one embodiment, the sensing panel may be disposed on the window, and the location of the sensing panel is not specifically limited.

At least one of the fingerprint sensor 161-1, the input sensor 161-2, and the digitizer 161-3 may be embedded in the display panel 141. That is, at least one of the fingerprint sensor 161-1, the input sensor 161-2, and the digitizer 161-3 may be simultaneously formed through a process of forming elements (e.g., a light emitting device and transistors) included in the display panel 141.

In addition, the sensor module 161 may generate an electrical signal or a data value corresponding to an internal state or an external state of the electronic device 101. The sensor module 161 may further include, for example, a gesture sensor, a gyro sensor, a barometric pressure sensor, a magnetic sensor, an acceleration sensor, a grip sensor, a proximity sensor, a color sensor, an infrared ("IR") sensor, a biometric sensor, a temperature sensor, a humidity sensor, or an illuminance sensor.

The antenna module 162 may include one or more antennas to transmit or receive the signal or power to or from an external source. According to an embodiment, through an antenna suitable for a communication method, the communication module 173 may transmit a signal to an external electronic device or may receive a signal from the external electronic device. An antenna pattern of the antenna module 162 may be integrated with one component (e.g., the display panel 141) of the display module 140 or the input sensor 161-2.

The sound output module 163 that is a device for outputting a sound signal to the outside of the electronic device 101 may include, for example, a speaker used for general purposes such as multimedia playback or recording playback and a receiver used exclusively for receiving calls. According to an embodiment, the receiver and the speaker may be either integrally or separately implemented. The sound output module 163 may be integrated with the display module 140.

The camera module 171 may photograph a still image and a moving image. According to one embodiment, the camera module 171 may include one or more lenses, an image sensor, or an image signal processor. The camera module 171 may further include an infrared camera capable of measuring the presence or absence of the user, the location of the user, and the line of sight of the user.

The light module 172 may provide a light. The light module 172 may include a light emitting diode or a xenon lamp. The light module 172 may operate in conjunction with the camera module 171 or may operate independently.

The communication module 173 may establish a wired or wireless communication channel between the electronic device 101 and the external electronic device 102 and may support communication execution through the established communication channel. The communication module 173 may include one of a wireless communication module, such as a cellular communication module, a short-range wireless communication module, or a global navigation satellite system ("GNSS") communication module, and a wired communication module, such as a local area network ("LAN") communication module or a power line communication module or may include all thereof. The communication module 173 may communicate with the external electronic device 102 over a short-range communication network such as Bluetooth, Wi-Fi direct, or infrared data association ("IrDA") or a long-range communication network such as a cellular network, an Internet, or a computer network (e.g., a LAN or WAN). Various kinds of communication modules described above may be implemented with one chip or with separate chips, respectively.

The input module 130, the sensor module 161, the camera module 171, etc. may be used to control the operation of the display module 140 in conjunction with the processor 110.

The processor 110 outputs commands or data to the display module 140, the sound output module 163, the camera module 171, or the light module 172 based on the input data received from the input module 130. In an embodiment, for example, the processor 110 may generate the image data corresponding to the input data applied through the mouse or the active pen and may output the image data to the display module 140; alternatively, the processor 110 may generate command data corresponding to the input data and may output the command data to the camera module 171 or the light module 172. When input data are not received from the input module 130 during a given time period, the processor 110 may switch an operating mode of the electronic device 101 to a low-power mode or a sleep mode such that the power consumption of the electronic device 101 is reduced.

The processor 110 outputs commands or data to the display module 140, the sound output module 163, the camera module 171, or the light module 172 based on the sensing data received from the sensor module 161. For example, the processor 110 may compare authentication data obtained through the fingerprint sensor 161-1 with authentication data stored in the memory 120 and may then execute an application depending on a comparison result. The processor 110 may execute a command based on the sensing data sensed by the input sensor 161-2 or the digitizer 161-3 or may output image data corresponding to the sensing data to the display module 140. When the sensor module 161 includes a temperature sensor, the processor 110 may receive temperature data associated with the measured temperature from the sensor module 161 and may further perform luminance correction on the image data based on the temperature data.

The processor 110 may receive measurement data about the presence or absence of the user, the location of the user, and the line of sight of the user from the camera module 171. The processor 110 may further perform the luminance correction on the image data based on the measurement data. In an embodiment, for example, the processor 110 that determines the presence or absence of the user through the input from the camera module 171 may display image data whose luminance is corrected through the data conversion circuit 112-2 or the gamma correction circuit 112-3.

Some of the above components may be connected with each other through a communication scheme between peripheral devices, for example, a bus, a general purpose input/output ("GPIO"), a serial peripheral interface ("SPI"), a mobile industry processor interface ("MIPI"), or an ultra path interconnect ("UPI") link and may exchange signals (e.g., commands or data). The processor 110 may communicate with the display module 140 through a given interface. For example, one of the communication methods described above may be used, and the present disclosure is not limited thereto.

The electronic device 101 according to various embodiments of the present disclosure may be implemented as various types of devices. The electronic device 101 may include, for example, at least one of a portable communication device (e.g., a smartphone), a computer device, a portable multimedia device, a portable medical device, a camera, a wearable device, and home appliances. The electronic device 101 according to an embodiment of the present disclosure is not limited to the above devices.

The data driving circuit with the above configuration may output a test data voltage to test dummy pixels.

Figure 12:
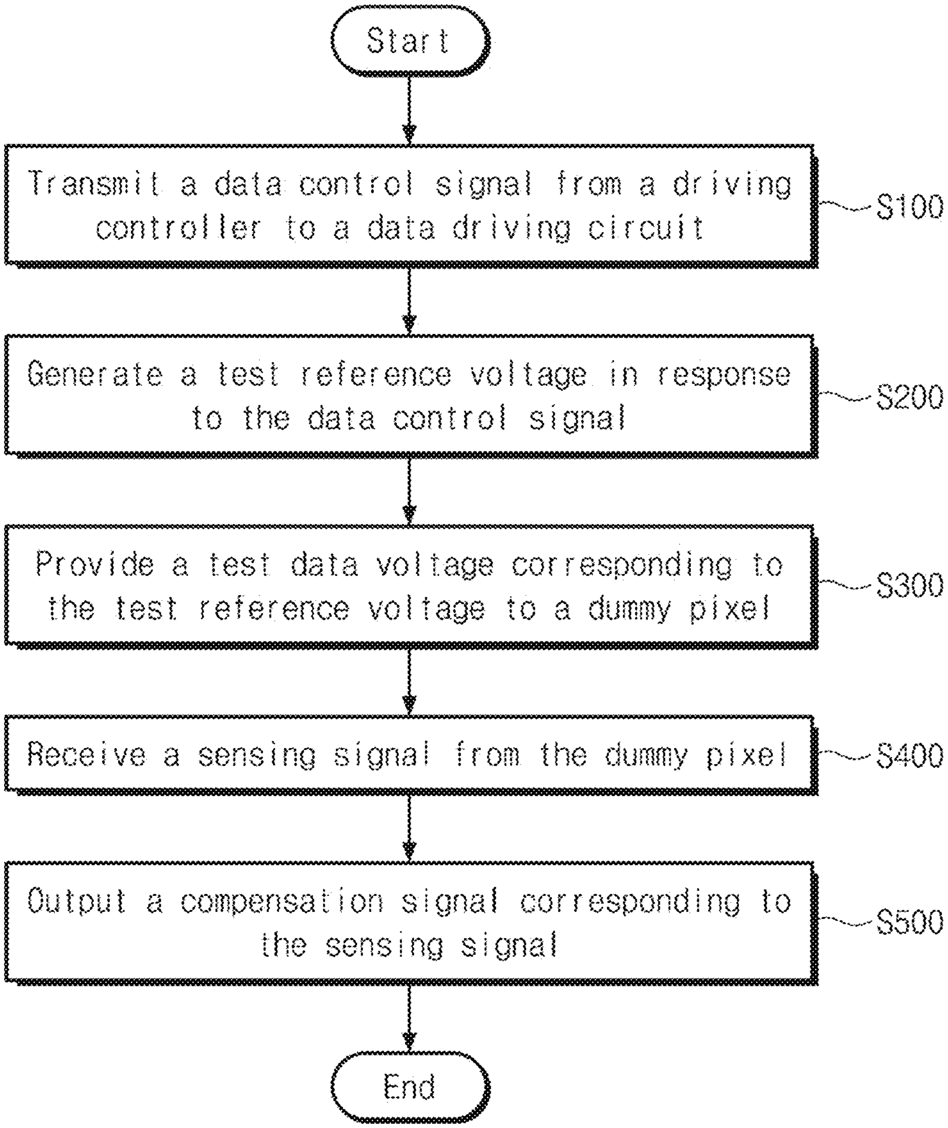
FIG. 12 is a flow chart of an operating method of a display device, according to an embodiment of the present disclosure.

FIG. 12 is a flow chart of an operating method of a display device, according to an embodiment of the present disclosure.

In an embodiment, an operating method of a display device, includes: transmitting a data control signal from a driving controller to a data driving circuit (S100); generating a test reference voltage in response to the data control signal (S200); providing a test data voltage corresponding to the test reference voltage to a dummy pixel (S300); receiving a sensing signal from the dummy pixel (S400); and outputting a compensation signal corresponding to the sensing signal (S500). The generating of the test reference voltage may include generating the test reference voltage having a predetermined voltage level based on the data control signal. In an embodiment, the operating method may further include: predicting a characteristic change of a pixel based on the compensation signal; and outputting an output image signal corresponding to the predicted characteristic change, by the driving controller.

A display device may predict the degradation of pixels by providing test data voltage to a dummy pixel and sensing the degree of degradation of the dummy pixel. In particular, because the data driving circuit provides the test data voltage to test the dummy pixel, a separate circuit configuration for generating the test data voltage is not required.

Also, because the voltage level of the test data voltage is capable of being changed by a driving controller, the degree of degradation of the pixel and the dummy pixel may be sensed more accurately.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A data driving circuit comprising:

a reference voltage generator configured to receive a data control signal and to generate a gamma reference voltage and a test reference voltage;

a data driving unit configured to output a data signal for a pixel based on the gamma reference voltage; and an output circuit configured to output a test data voltage for a dummy pixel based on the test reference voltage, wherein the reference voltage generator includes:

a first input amplifier configured to receive an upper limit reference voltage;

a second input amplifier configured to receive a lower limit reference voltage;

a resistor string connected between an output terminal of the first input amplifier and an output terminal of the second input amplifier, and configured to output a plurality of voltages that have different voltage levels from each other;

a first output amplifier configured to output one of the plurality of voltages from the resistor string as the gamma reference voltage;

a decoder configured to select one voltage among the plurality of voltages in response to the data control signal; and a second output amplifier configured to output a voltage selected by the decoder as the test reference voltage.

2. The data driving circuit of claim 1, wherein the data control signal includes information about a voltage level of the test reference voltage, and wherein the reference voltage generator generates the test reference voltage having a predetermined voltage level based on the data control signal.

3. The data driving circuit of claim 1, wherein the reference voltage generator, the data driving unit, and the output circuit are implemented with an integrated circuit, wherein the integrated circuit includes a long edge and a short edge, wherein the data signal is output from the long edge of the integrated circuit, and wherein the test data voltage is output from the short edge of the integrated circuit.

4. A display device comprising:

a display panel divided into an active area and a peripheral area and including pixels disposed in the active area and dummy pixels disposed in the peripheral area;

a data driver configured to receive an output image signal and a data control signal, to provide a data signal to each of the pixels, and to provide a test data voltage to the dummy pixels;

a driving controller configured to provide the output image signal and the data control signal; and a degradation detection circuit configured to receive a sensing signal from the dummy pixels and to provide a compensation signal corresponding to the sensing signal to the driving controller, wherein the data driver is disposed in the peripheral area of the display panel, and wherein the dummy pixels are disposed adjacent to a short edge of the data driver.

5. The display device of claim 4, wherein the data driver includes a first data driving circuit and a second data driving circuit configured to drive some of the pixels, and wherein the dummy pixels are disposed between the first data driving circuit and the second data driving circuit.

6. The display device of claim 5, wherein each of the dummy pixels receives the test data voltage from one of the first data driving circuit and the second data driving circuit.

7. The display device of claim 5, wherein the data driver includes:

a reference voltage generator configured to receive a data control signal and to generate a gamma reference voltage and a test reference voltage;

a data driving unit configured to output the data signal based on the gamma reference voltage; and an output circuit configured to receive the test reference voltage and to output the test data voltage.

8. The display device of claim 7, wherein the data control signal includes information about a voltage level of the test reference voltage, and wherein the reference voltage generator generates the test reference voltage having a predetermined voltage level based on the data control signal.

9. The display device of claim 7, wherein the reference voltage generator, the data driving unit, and the output circuit are implemented with an integrated circuit, wherein the integrated circuit includes a long edge and a short edge, wherein the data signal is output from the long edge of the integrated circuit, and wherein the test data voltage is output from the short edge of the integrated circuit.

10. The display device of claim 7, wherein the first data driving circuit and the second data driving circuit are sequentially disposed in a first direction, and wherein the dummy pixels include a first color dummy pixel and a second color dummy pixel sequentially disposed in the first direction between the first data driving circuit and the second data driving circuit.

11. The display device of claim 10, wherein the test data voltage output from the first data driving circuit is provided to the first color dummy pixel, and wherein the test data voltage output from the second data driving circuit is provided to the second color dummy pixel.

12. The display device of claim 10, wherein the test reference voltage output from the first data driving circuit corresponds to a first color, wherein the test reference voltage output from the second data driving circuit corresponds to a second color, wherein the first data driving circuit outputs a first color test data voltage based on the test reference voltage from the first data driving circuit and outputs a second color test data voltage based on the test reference voltage from the second data driving circuit, and wherein the first color test data voltage from the first data driving circuit is provided to the first color dummy pixel.

13. The display device of claim 10, wherein the test reference voltage output from the first data driving circuit corresponds to a first color, wherein the test reference voltage output from the second data driving circuit corresponds to a second color, wherein the second data driving circuit outputs a first color test data voltage based on the test reference voltage from the first data driving circuit and outputs a second color test data voltage based on the test reference voltage from the second data driving circuit, and wherein the second color test data voltage from the second data driving circuit is provided to the second color dummy pixel.

14. The display device of claim 7, wherein the output image signal includes active data to be provided to the pixels, wherein the data control signal includes a frame protocol including information about a voltage level of the test reference voltage, wherein one frame includes an active period and a blank period, wherein the active data are provided from the driving controller to the data driver during the active period, and wherein the frame protocol is provided from the driving controller to the data driver during the blank period.

15. The display device of claim 7, wherein the reference voltage generator includes:

a first input amplifier configured to receive an upper limit reference voltage;

a second input amplifier configured to receive a lower limit reference voltage;

a resistor string connected between an output terminal of the first input amplifier and an output terminal of the second input amplifier, and configured to output a plurality of voltages;

a first output amplifier configured to output one of the plurality of voltages from the resistor string as the gamma reference voltage;

a decoder configured to select one voltage among the plurality of voltages in response to the data control signal; and a second output amplifier configured to output a voltage selected by the decoder as the test reference voltage.

16. An operating method of a display device, the method comprising:

transmitting a data control signal from a driving controller to a data driving circuit;

generating a test reference voltage in response to the data control signal;

providing a test data voltage corresponding to the test reference voltage to a dummy pixel;

receiving a sensing signal from the dummy pixel; and outputting a compensation signal corresponding to the sensing signal, wherein the dummy pixel is disposed adjacent to a short edge of the data driving circuit.

17. The method of claim 16, wherein the data control signal includes information about a voltage level of the test reference voltage, and wherein the generating of the test reference voltage includes generating the test reference voltage having a predetermined voltage level based on the data control signal.

18. The method of claim 16, wherein the test data voltage is output from the short edge of the data driving circuit.

19. The method of claim 16, further comprising:

predicting a characteristic change of a pixel based on the compensation signal; and outputting an output image signal corresponding to the predicted characteristic change, by the driving controller.

20. An electronic device comprising:

a display panel divided into an active area and a peripheral area and including pixels disposed in the active area and dummy pixels disposed in the peripheral area;

a data driver configured to receive an output image signal and a data control signal, to provide a data signal to each of the pixels, and to provide a test data voltage to the dummy pixels;

a driving controller configured to provide the output image signal and the data control signal; and a degradation detection circuit configured to receive a sensing signal from the dummy pixels and to provide a compensation signal corresponding to the sensing signal to the driving controller, wherein the data driver is disposed in the peripheral area of the display panel, and wherein the dummy pixels are disposed adjacent to a short edge of the data driver.

* * * * *